US010353482B2

(12) United States Patent
Nie

(10) Patent No.: US 10,353,482 B2
(45) Date of Patent: *Jul. 16, 2019

(54) SYSTEMS AND METHODS FOR TRACKING MOTION AND GESTURE OF HEADS AND EYES

(71) Applicant: Vuelosophy Inc., Mountain View, CA (US)

(72) Inventor: Xiaochun Nie, Mountain View, CA (US)

(73) Assignee: Vuelosophy Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/671,097

(22) Filed: Aug. 7, 2017

(65) Prior Publication Data

US 2018/0157332 A1 Jun. 7, 2018

Related U.S. Application Data

(63) Continuation of application No. 15/387,024, filed on Dec. 21, 2016, now Pat. No. 9,785,249, which is a continuation of application No. PCT/US2016/065141, filed on Dec. 6, 2016.

(51) Int. Cl.
*G06F 3/01* (2006.01)
*G06K 9/00* (2006.01)

(52) U.S. Cl.
CPC ............. *G06F 3/017* (2013.01); *G06F 3/012* (2013.01); *G06F 3/013* (2013.01); *G06K 9/00* (2013.01)

(58) Field of Classification Search
CPC .......... G06F 3/017; G06F 3/012; G06F 3/013; G06K 9/00; G06T 7/73; G06T 2207/30201; G02B 2027/0138; G02B 2027/0187; G02B 27/0093
See application file for complete search history.

(56) References Cited

U.S. PATENT DOCUMENTS

| 8,928,696 | B1* | 1/2015 | Yang | G01C 25/00 345/659 |
| 9,526,443 | B1* | 12/2016 | Berme | A61B 5/1123 |
| 9,785,249 | B1* | 10/2017 | Nie | G06F 3/017 |
| 10,007,391 | B2* | 6/2018 | Sabatelli | G06F 3/0481 |
| 2005/0110751 | A1* | 5/2005 | Wilson | G08C 17/00 345/156 |

(Continued)

*Primary Examiner* — Tom V Sheng
(74) *Attorney, Agent, or Firm* — IPro, PLLC; Qian Gu

(57) ABSTRACT

Apparatus, systems and methods configured for tracking head and eye movement are disclosed. In one example, an apparatus comprises an imaging sensor, a spatial orientation sensor and a computing device comprising a processor and a memory communicatively coupled with the processor. The imaging sensor is configured for capturing and recording images of an eye of a user when the user stares at a gaze point and rotates a head of the user about a first axis and about a second axis that is orthogonal to the first axis. The spatial orientation sensor is coupled to the imaging sensor such that the imaging sensor has a fixed position and a fixed orientation relative to the spatial orientation sensor and is configured for generating outputs during the rotations of the head of the user, wherein each of the outputs corresponds to one of the images of the eye.

16 Claims, 17 Drawing Sheets

(56) References Cited

U.S. PATENT DOCUMENTS

| | | | |
|---|---|---|---|
| 2008/0297437 A1* | 12/2008 | Takahashi | G02B 27/017 |
| | | | 345/8 |
| 2014/0375545 A1* | 12/2014 | Ackerman | G06F 3/017 |
| | | | 345/156 |
| 2015/0189266 A1* | 7/2015 | Zhou | H04N 13/341 |
| | | | 348/54 |
| 2015/0215601 A1* | 7/2015 | Zhou | G06F 3/013 |
| | | | 348/43 |
| 2015/0228118 A1* | 8/2015 | Eade | G06T 19/006 |
| | | | 345/633 |
| 2016/0025981 A1* | 1/2016 | Burns | G02B 27/0093 |
| | | | 345/156 |
| 2016/0063303 A1* | 3/2016 | Cheung | A61B 3/113 |
| | | | 382/103 |
| 2016/0077592 A1* | 3/2016 | Bhesania | G06F 3/011 |
| | | | 345/650 |
| 2016/0131908 A1* | 5/2016 | Fateh | G06F 3/147 |
| | | | 345/633 |
| 2016/0187969 A1* | 6/2016 | Larsen | G06F 3/012 |
| | | | 345/156 |
| 2016/0262608 A1* | 9/2016 | Krueger | A61B 3/0041 |
| 2017/0184846 A1* | 6/2017 | Lu | G02B 27/017 |
| 2017/0277256 A1* | 9/2017 | Burns | G02B 27/0093 |
| 2018/0004283 A1* | 1/2018 | Mathey-Owens | |
| | | | G06F 3/04815 |
| 2018/0150204 A1* | 5/2018 | MacGillivray | G06F 3/012 |
| 2018/0239430 A1* | 8/2018 | Tadi | G02B 27/0172 |

\* cited by examiner

SYSTEMS AND METHODS FOR TRACKING MOTION AND GESTURE OF HEADS AND EYES

TECHNICAL FIELD

The present teaching generally relates to human machine interaction technology. More specifically, the present teaching relates to systems and methods for tracking motion and gesture of human heads and eyes.

BACKGROUND

Human computer interaction (HCI), or generally human machine interaction, focuses on design and use of computer technology as well as interfaces between users and computers. HCI depends on responsive, intuitive and accurate measurements of human input actions. Mouse, keyboard and touch screen are conventional input devices that require user's hands-on controls. Some input devices like Microsoft Kinect and Leap Motion Controller are capable of tracking the user's body and/or hand gestures without any physical contact.

The recent progress in virtual reality (VR) brought goggles like Oculus Rift and HTC Vive to consumer market. VR goggles can create immersive 3 dimensional (3D) experiences to a user. The user can look around in virtual world by a turn of the head just like looking around in the real world.

Augmented reality (AR) is another area that is progressing fast. One major difference between AR and VR is that AR operates in real-time on real world scenes as opposed to solely computer created or recorded scenes in VR. In both VR and AR, it will be very useful for the system to know where the user is looking at and what actions the user wants to take on the intended targets. Effective and reliable Head and eye tracking will enable a broad range of applications under such circumstances.

Self-driving vehicles are also taking the front stage nowadays. There are situations where a car in its autonomous mode might need a driver's attention due to updated road/traffic conditions or driving mode changes etc. As such, it is important to constantly monitor where the driver is looking at.

Machine learning and artificial intelligence (AI) may work in a cycle of learning, modeling and predicting. A quick and intuitive way to track and confirm the user's attention point for data acquisition and confirmation can play an important role in this loop.

Existing head and eye tracking systems include a very complicated structure that incurs a high cost, and require a user to perform many actions during calibrations and operations.

Therefore, there is a need for a head and eye motion and gesture tracking system and a set of workflows for calibrations and operations without the above mentioned drawbacks.

SUMMARY

The present teaching generally relates to human machine interaction technology. More specifically, the present teaching relates to systems and methods for tracking motion and gesture of human heads and eyes.

In one example, an apparatus configured for tracking head movement is disclosed. The apparatus comprises a spatial orientation sensor and a computing device comprising a processor and a memory communicatively coupled with the processor. The spatial orientation sensor is configured for generating a first output during a first rotation of a head of the user about a first axis and generating a second output during a second rotation of the head of the user about a second axis that is orthogonal to the first axis. The processor is configured for determining an orientation relationship between the head and the spatial orientation sensor based on the first and second outputs.

According to an embodiment, the computing device comprises a working mode coordinator configured for determining a working mode for the computing device based on an input of the user, wherein the working mode is at least one of: head calibration, head tracking, and gesture determination.

According to an embodiment, the computing device comprises a head calibrator configured for: obtaining the first output of the spatial orientation sensor; calculating a first rotation vector aligned with the first axis based on the first output; obtaining the second output of the spatial orientation sensor; calculating a second rotation vector aligned with the second axis based on the second output; and calculating one or more parameters representing an orientation relationship between the head and the spatial orientation sensor based on the first and second rotation vectors.

According to an embodiment, the computing device comprises a head tracker configured for: obtaining an initial output of the spatial orientation sensor when the head is at an initial orientation; obtaining a final output of the spatial orientation sensor when the head is at a final orientation; and detecting a head movement from the initial orientation to the final orientation, based on the initial output of the spatial orientation sensor, the final output of the spatial orientation sensor, and the orientation relationship between the head and the spatial orientation sensor.

According to an embodiment, the head tracker is further configured for: configuring the final output to be a new initial output of the spatial orientation sensor; and configuring the final orientation to be a new initial orientation of the head, such that future detection of a head movement is relative to the new initial orientation.

According to an embodiment, the computing device comprises a gesture determiner configured for: determining a head gesture based on the detected head movement, wherein the head gesture is head nod when the head moves up and down about a third axis, wherein the head gesture is head shake when the head moves left and right about a fourth axis that is orthogonal to the third axis, and wherein the head gesture is head bobble when the head moves about a fifth axis that is orthogonal to both the third axis and the fourth axis.

According to an embodiment, the computing device comprises an instruction generator configured for generating an instruction based on the determined head gesture, wherein the instruction corresponds to an input of the user to a machine.

According to an embodiment, an orientation measured by the apparatus is represented based on at least one of: a quaternion, Euler angles, and a matrix.

According to an embodiment, the apparatus is capable of being mounted to a device worn on head.

According to an embodiment, the spatial orientation sensor is the only spatial orientation sensor in the apparatus.

In another example, an apparatus configured for tracking eye movement is disclosed. The apparatus comprises an imaging sensor, a spatial orientation sensor and a computing device comprising a processor and a memory communicatively coupled with the processor. The imaging sensor is configured for capturing and recording images of an eye of a user when the user stares at a gaze point and performs a sequence of eye motions. The spatial orientation sensor is coupled to the imaging sensor such that the imaging sensor has a fixed position and a fixed orientation relative to the spatial orientation sensor and is configured for generating outputs during the sequence of eye motions, wherein each of the outputs corresponds to one of the images of the eye. The processor is configured for determining a position relationship between an eyeball center of the eye and the imaging sensor based on: the images of the eye, the outputs of the spatial orientation sensor, and the fixed orientation of the imaging sensor relative to the spatial orientation sensor.

According to an embodiment, the computing device comprises a working mode coordinator configured for determining a working mode for the computing device based on an input of the user, wherein the working mode is at least one of: eye calibration, eye tracking, and gesture determination.

According to an embodiment, the apparatus is mounted on a fixed platform and the computing device is further configured for: configuring two markers in front of the imaging sensor; configuring three evenly spaced horizontal lines on a screen of the imaging sensor, wherein a middle line of the three lines is in middle of the screen; obtaining a first output of the spatial orientation sensor when the imaging sensor is oriented to an orientation such that an image of the two markers sits in middle of a top line of the three lines; obtaining a second output of the spatial orientation sensor when the imaging sensor is oriented to an orientation such that an image of the two markers sits in middle of a bottom line of the three lines; obtaining a third output of the spatial orientation sensor when the imaging sensor is oriented to an orientation such that an image of the two markers sits on left side of the middle line of the three lines; obtaining a fourth output of the spatial orientation sensor when the imaging sensor is oriented to an orientation such that an image of the two markers sits on right side of the middle line of the three lines; and calculating the fixed orientation of the imaging sensor relative to the spatial orientation sensor and a focal length of the imaging sensor based on the first, second, third, and fourth outputs.

According to an embodiment, the computing device comprises an eye calibrator configured for instructing the user to stare at the gaze point and perform the sequence of eye motions; obtaining a sequence of data pairs each of which includes an image of the eye and a corresponding output of the spatial orientation sensor; obtaining coordinates of an eyeball center of the eye in each image; and calculating coordinates of the eyeball center relative to the imaging sensor.

According to an embodiment, the eye calibrator is further configured for calculating coordinates of eyeball centers of both eyes of the user relative to the imaging sensor based on images of both eyes captured by the imaging sensor.

According to an embodiment, the computing device comprises an eye tracker configured for: calculating a gaze vector pointing through an eyeball center of the eye on a head to an object the user is looking at, relative to the imaging sensor; calculating the gaze vector relative to the head based on the gaze vector relative to the imaging sensor; calculating a final orientation of the eye relative to the head based on the gaze vector relative to the head; detecting an eye movement of the eye from a predetermined initial orientation to the final orientation of the eye relative to the head, based on: the predetermined initial orientation of the eye relative to the head and the final orientation of the eye relative to the head; and calculating a final gaze vector relative to the world based on the eye movement of the eye and an orientation relationship between the head and the spatial orientation sensor.

According to an embodiment, the eye tracker is further configured for: configuring the final orientation of the eye to be a new initial orientation of the eye relative to the head, such that future detection of an eye movement is based on the new initial orientation of the eye relative to the head.

According to an embodiment, the computing device comprises a gesture determiner configured for determining an eye gesture based on the detected eye movement, wherein the eye gesture is a stare condition when the gaze vector relative to the world is limited in a predetermined small range over a period of time.

According to an embodiment, the computing device comprises an instruction generator configured for generating an instruction based on the determined eye gesture, wherein the instruction corresponds to an input of the user to a machine.

According to an embodiment, the eye tracker is further configured for detecting eye movements of both eyes of the user, wherein a gaze vector corresponding to each of the eyes moves from a predetermined initial orientation to a final orientation relative to the world.

According to an embodiment, the apparatus comprises no more imaging sensor other than the imaging sensor and no more spatial orientation sensor other than the spatial orientation sensor.

In yet another example, an apparatus configured for tracking head and eye movement is disclosed. The apparatus comprises an imaging sensor, a spatial orientation sensor and a computing device comprising a processor and a memory communicatively coupled with the processor. The imaging sensor is configured for capturing and recording images of an eye of a user when the user stares at a gaze point and rotates a head of the user about a first axis and about a second axis that is orthogonal to the first axis. The spatial orientation sensor is coupled to the imaging sensor such that the imaging sensor has a fixed position and a fixed orientation relative to the spatial orientation sensor and is configured for generating outputs during the rotations of the head of the user, wherein each of the outputs corresponds to one of the images of the eye. The processor is configured for: determining an orientation relationship between the head and the spatial orientation sensor based on the outputs, and determining a position relationship between the center of an eyeball of the eye and the imaging sensor based on: the images of the eye, the outputs of the spatial orientation sensor, and the fixed orientation of the imaging sensor relative to the spatial orientation sensor.

According to an embodiment, the computing device comprises: a head tracker configured for: obtaining an initial output of the spatial orientation sensor when the head is at an initial orientation, obtaining a final output of the spatial orientation sensor when the head is at a final orientation, and detecting a head movement from the initial orientation to the final orientation, based on the initial output of the spatial orientation sensor, the final output of the spatial orientation sensor, and the orientation relationship between the head and the spatial orientation sensor; and an eye tracker configured for: calculating a gaze vector pointing through the center of the eyeball to an object the user is looking at, relative to the imaging sensor, calculating a gaze vector relative to the head based on the gaze vector relative to the imaging sensor, calculating a final orientation of the eye relative to the head based on the gaze vector relative to the head, detecting an eye movement of the eye from a predetermined initial orientation to the final orientation of the eye relative to the head, based on: the predetermined initial orientation of the eye relative to the head and the final orientation of the eye relative to the head, and calculating a final gaze vector relative to the world based on the eye movement of the eye and an orientation relationship between the head and the spatial orientation sensor.

According to an embodiment, the head movement and the eye movement are detected at the same time.

According to an embodiment, the head movement and the eye movement are detected independently from each other.

According to an embodiment, the eye tracker is further configured for configuring the final orientation of the eye to be a new initial orientation of the eye relative to the head, such that future detection of an eye movement is based on the new initial orientation of the eye relative to the head; and the head tracker is further configured for: configuring the final output to be a new initial output of the spatial orientation sensor; and configuring the final orientation to be a new initial orientation of the head, such that future detection of a head movement is relative to the new initial orientation of the head.

According to an embodiment, the computing device comprises a gesture determiner configured for: determining a head gesture based on the detected head movement, wherein the head gesture is head nod when the head moves up and down about a third axis, wherein the head gesture is head shake when the head moves left and right about a fourth axis that is orthogonal to the third axis, and wherein the head gesture is head bobble when the head moves about a fifth axis that is orthogonal to both the third axis and the fourth axis; determining an eye gesture based on the detected eye movement, wherein the eye gesture is a stare condition when the gaze vector is limited in a predetermined small range over a period of time; and determining a gesture combination based on the eye gesture and the head gesture.

According to an embodiment, the computing device comprises an instruction generator configured for generating an instruction based on the determined gesture combination, wherein the instruction corresponds to an input of the user to a machine.

According to an embodiment, the apparatus comprises no more imaging sensor other than the imaging sensor and no more spatial orientation sensor other than the spatial orientation sensor.

Disclosed herein includes a system comprising the apparatus described above and a headset coupled to the apparatus. The system is configured for providing a virtual reality for a wearer of the headset.

Disclosed herein includes a system comprising the apparatus described above and a headset coupled to the apparatus. The system is configured for providing an augmented reality for a wearer of the headset.

Disclosed herein includes a system comprising the apparatus described above and a headset coupled to the apparatus. The system is configured for providing an augmented reality for a driver wearing the headset in a self-driving vehicle.

Disclosed herein includes a system comprising the apparatus described above and a headset coupled to the apparatus. The system is configured for developing artificial intelligence and/or machine learning based on inputs from a user wearing the headset.

Disclosed herein includes a system comprising the apparatus described above and a wearable device coupled to the apparatus. The system is configured for developing human machine interaction based on inputs from a user wearing the wearable device.

In a different example, a method, implemented on a machine comprising at least one processor and a memory for tracking a movement of an object, is disclosed. The method comprises: generating a first output during a first rotation of the object about a first axis; generating a second output during a second rotation of the object about a second axis that is orthogonal to the first axis; and determining an orientation relationship between the object and the spatial orientation sensor based on the first and second outputs.

According to an embodiment, the object is a head of a user.

In another example, a method, implemented on a machine comprising at least one processor and a memory for tracking head and eye movement, is disclosed. The method comprises: capturing and recording, by an imaging sensor, images of an eye of a user when the user stares at a gaze point and performs a sequence of head and eye motions; generating, by a spatial orientation sensor, outputs during the sequence of head and eye motions, wherein each of the outputs corresponds to one of the images of the eye, wherein the imaging sensor has a fixed position and a fixed orientation relative to the spatial orientation sensor; and determining, by the at least one processor, a position relationship between a center of an eyeball of the eye and the imaging sensor based on: the images of the eye, the outputs of the spatial orientation sensor, and the fixed orientation of the imaging sensor relative to the spatial orientation sensor.

In yet another example, a method, implemented on a machine comprising at least one processor and a memory for tracking head and eye movement, is disclosed. The method comprises: capturing and recording, by an imaging sensor, images of an eye of a user when the user stares at a gaze point and rotates a head of the user about a first axis and about a second axis that is orthogonal to the first axis; generating, by a spatial orientation sensor, outputs during the rotations of the head of the user, wherein each of the outputs corresponds to one of the images of the eye, wherein the imaging sensor has a fixed position and a fixed orientation relative to the spatial orientation sensor; determining, by the at least one processor, an orientation relationship between the head and the spatial orientation sensor based on the outputs; and determining, by the at least one processor, a position relationship between a center of an eyeball of the eye and the imaging sensor based on: the images of the eye, the outputs of the spatial orientation sensor, and the fixed orientation of the imaging sensor relative to the spatial orientation sensor.

In yet another example, a machine-readable tangible and non-transitory medium having information for tracking head and eye movement, wherein the information, when read by the machine, causes the machine to perform the following: generating a first output during a first rotation of a head of a user about a first axis; generating a second output during a second rotation of the head of the user about a second axis that is orthogonal to the first axis; and determining an orientation relationship between the head and the spatial orientation sensor based on the first and second outputs.

In still another example, an apparatus is disclosed. The apparatus comprises an imaging sensor, a spatial orientation sensor, and a computing device comprising a processor and a memory communicatively coupled with the processor. The spatial orientation sensor is coupled to the imaging sensor such that the imaging sensor has a fixed position and a fixed orientation relative to the spatial orientation. The processor is configured for: configuring two markers in front of the imaging sensor, configuring three evenly spaced horizontal lines on a screen of the imaging sensor, wherein a middle line of the three lines is in middle of the screen, obtaining a first output of the spatial orientation sensor when the imaging sensor is oriented to an orientation such that an image of the two markers sits in middle of a top line of the three lines, obtaining a second output of the spatial orientation sensor when the imaging sensor is oriented to an orientation such that an image of the two markers sits in middle of a bottom line of the three lines, obtaining a third output of the spatial orientation sensor when the imaging sensor is oriented to an orientation such that an image of the two markers sits on left side of the middle line of the three lines, obtaining a fourth output of the spatial orientation sensor when the imaging sensor is oriented to an orientation such that an image of the two markers sits on right side of the middle line of the three lines, and calculating the fixed orientation of the imaging sensor relative to the spatial orientation sensor and a focal length of the imaging sensor based on the first, second, third, and fourth outputs.

Additional novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to a wearable system for tracking head and eye motion and gesture. The system may achieve real time performance in good accuracy, and can be implemented using low cost off-the-shelf components. The present teaching discloses various calibration and tracking procedures of the system.

Figure 1:
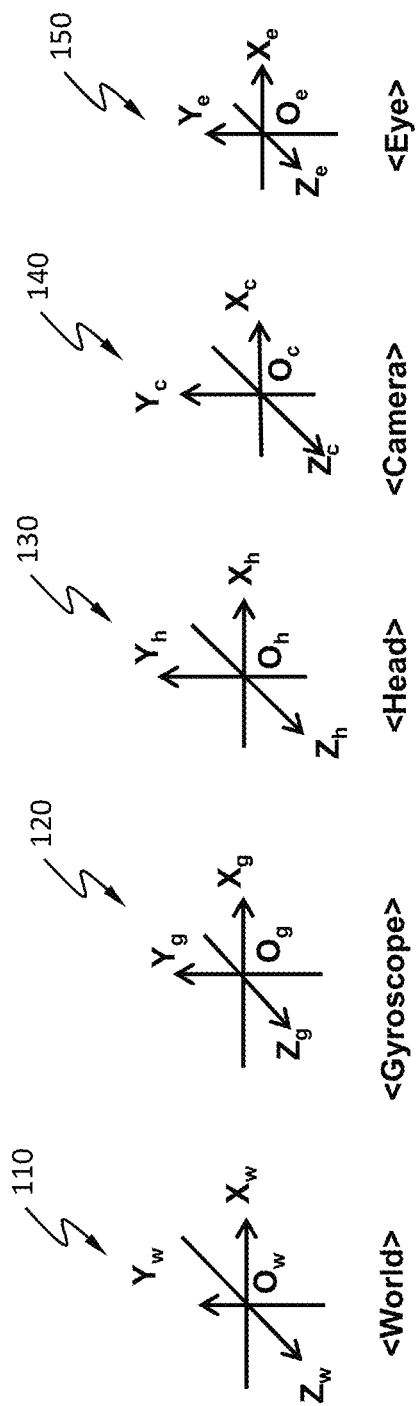
FIG. 1 illustrates various 3D coordinate systems referred in the tracking system described herein, according to an embodiment of the present teaching.

To better illustrate methods and systems disclosed in the present teaching, FIG. 1 illustrates various 3D coordinate systems referred in the tracking system described herein, according to an embodiment of the present teaching. There are five 3D coordinate systems referred in this system as shown in FIG. 1: World coordinate system Xw-Yw-Zw-Ow, represented by CS-W 110; Gyroscope coordinate system Xg-Yg-Zg-Og represented by CS-G 120; Head coordinate system Xh-Yh-Zh-Oh represented by CS-H 130; Camera coordinate system Xc-Yc-Zc-Oc represented by CS-C 140; and Eye coordinate system Xe-Ye-Ze-Oe represented by CS-E 150.

An object coordinate system CS-O can refer to either CS-H or CS-C. A CS-E can refer to either left eye CS-HL or right eye CS-CR. The origin of CS-E is at the center of an eyeball. The unit of CS-C and CS-E is defined as the radius of eyeball. The containing order of these coordinate systems is: CS-W->CS-G->CS-H->CS-C->CS-E.

A terminology used in this present teaching can comprise 3 parts ABC: A: type, B: specific, C: context. As an example, to use a quaternion to represent the orientation of a camera in the gyroscope coordinate system, we can use qcg, where "q" stands for quaternion, "c" stands for camera and "g" stands for gyroscope.

The definition for a 3D coordinate system using right hand rule can be found in the Appendix section. The definition for a 2D coordinate system for Camera image frame can be found in the Appendix section.

Quaternion will be widely used in this present teaching. It is noted that a function using quaternion can have an equivalent expression using matrix. Mathematical utility functions including functions related to quaternion, vector and matrix used in this present teaching are listed in the Appendix section.

The CS-W can be defined in different contexts. In one embodiment, it can be aligned with certain landmarks at a given location on earth, or with the magnetic field of the earth, or certain conditions a sensor manufacture uses, therefore represented by CS-W0. In another embodiment, for simplification, it can be aligned with an initial orientation of the CS-G, therefore represented by CS-W1. In another embodiment, for simplification, it can be aligned with an initial orientation of a CS-O, therefore CS-W2. As such, a world coordinate system CS-W can refer to CS-W0, CS-W1 or CS-W2.

A gyroscope can measure its own orientation in 3D space. The raw output quaternion qgr of CS-G is in its pre-defined CS-W0 by the sensor. To simplify the mathematic model, CS-W1 can be defined by aligning the CS-W with an initial orientation of CS-G.

Therefore, the orientation quaternion qgw for CS-G in CS-W1 is:

$$qgw = q\_prd2(qgr0\_cnj, qgr)$$

where:

$$qgr0\_cnj = q\_cnj(qgr0)$$

qgr0 is the initial orientation quaternion of CS-G.

A gyroscope can be used to measure the orientation of an object in 3D space. Assuming qog is the quaternion representing the orientation of an CS-O in CS-G, qog can be obtained by one of the calibration procedures which will be described in detail later.

For reference, 2 quaternions are defined:
qhg is the quaternion representing the orientation of CS-H in CS-G;
qcg is the quaternion representing the orientation of CS-C in CS-G.

Knowing the orientation quaternion qog of an CS-O in CS-G, its orientation quaternion qogw in CS-W1 can be calculated as:

$$qogw = q\_prd2(qgw, qog)$$

where qgw is the orientation quaternion of CS-G in CS-W1.

To further simplify the orientation of CS-O in CS-W, the CS-W2 can be defined by aligning CS-W with an initial orientation of the CS-O.

Assuming qog0 is the initial orientation quaternion of the CS-O in CS-G, qow is the quaternion of CS-O in this new CS-W2, we have:

$$qow = q\_prd3(qog0\_cnj, qgw, qog)$$

where:

$$qog0\_cnj = q\_cnj(qog0).$$

Figure 2:
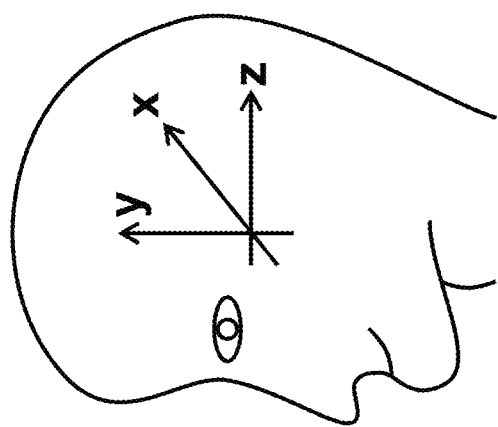
FIG. 2 illustrates an exemplary head coordinate system referred in the tracking system described herein, according to an embodiment of the present teaching.

The CS-H is shown in FIG. 2. The X axis pointing from user's left ear to the right ear, Y axis pointing from bottom of jaw pointing to the top of the head, and Z axis pointing from the tip of the nose to the back of the head. As a result, X axis aligns with our normal sense of horizontal direction, Y axis aligns with our normal sense of vertical direction, and Z axis aligns with our normal sense of front to back directions. The directions of rotation about its axes are defined in the Appendix section.

According to various embodiments of the present teaching, the system disclosed herein may include different components.

In one embodiment, the system includes one or more sensing unit. The sensing unit may include a gyroscope, or generally a spatial orientation sensor, which is a sensor that measures its orientation in 3D space. The spatial orientation sensor can be either a mechanical or an electronic device. The most commonly used electronic spatial orientation sensor usually fuses the outputs of accelerometer, gyroscope and magnetic field sensor to get a reliable output. A gyroscope can measure the rotation angle speed of an object along its 3 axes in 3D space. For simplicity, the terminology "gyroscope" will be used interchangeably with "spatial orientation sensor." A gyroscope's output can be in one of several formats, such as a 3 by 3 matrix, Euler angles or quaternion etc. Quaternion will be used as a gyroscope output for illustration in the present teaching. The gyroscope's raw output may be an orientation quaternion. More information about quaternion mathematics can be found in Appendix section. By attaching a gyroscope to an object, the orientation of that object can be measured.

The sensing unit may include a camera, which is an imaging sensor that measures the brightness and color of light. A camera can be of color, grayscale, infrared or non-infrared etc. Important parameters of a camera include its physical dimensions, resolution and focal length of the lens mounted etc. A 2D camera image frame coordinate system for is defined for camera output.

According to various embodiments of the present teaching, the system may have two typical sensing unit configurations. Configuration A includes only a gyroscope; while configuration B includes both a gyroscope and a camera. As gyroscope is in both configurations, the position and orientation of the sensing unit is set to be the same as those of the gyroscope. Therefore, CS-G is used for the coordinate system of sensing unit. Referring to the position and orientation of a sensing unit is the same as referring those of the gyroscope.

In one embodiment, the system includes a head gear or headset, which is an apparatus for fixing the sensing unit to user's head. The headset can be a glasses frame, a head mounted display or a helmet, etc., depending on the applications.

In one embodiment, the system includes a computer that processes the output of the sensing unit and calculates the motion/gesture tracking results. The computer can be either an embedded system or a desktop system.

In one embodiment, the system includes computer software installed on the computer for implementing the algorithms disclosed herein and enabling the workflows disclosed herein.

Figure 3:
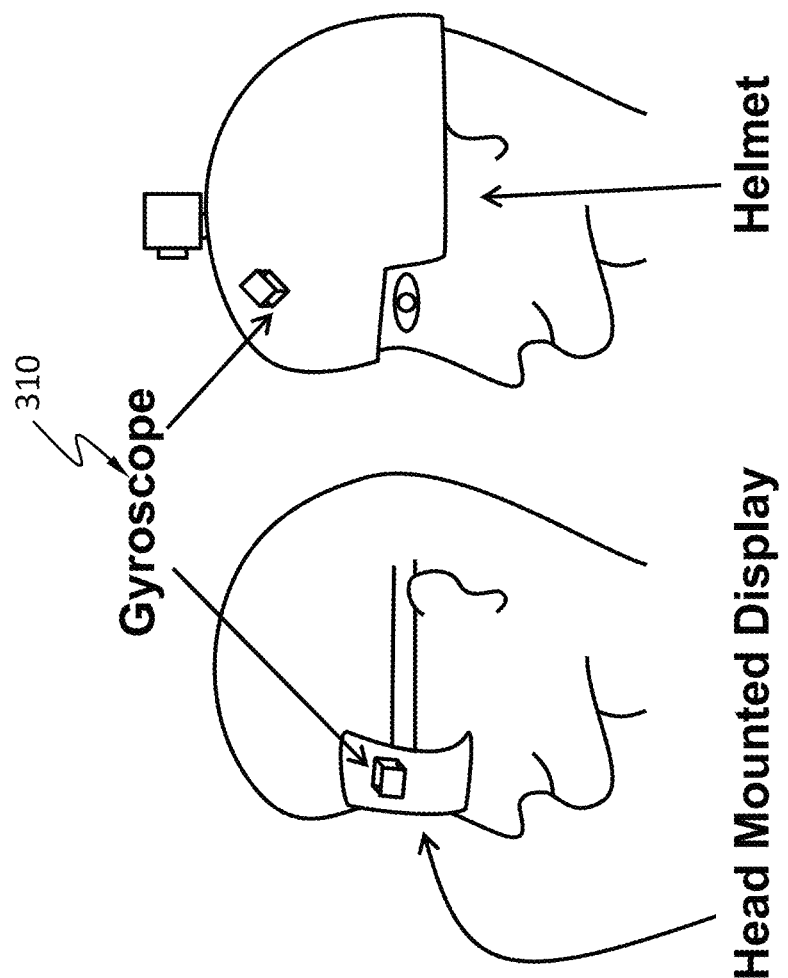
FIG. 3 illustrates an exemplary gyroscope that is mounted on a head gear or a helmet worn by a user, according to an embodiment of the present teaching.

As shown in FIG. 3, in configuration A, the sensing unit has only a gyroscope 310. The user wears the gyroscope on a head gear, which may be a head mounted display or a helmet, so that the head motion can be measured. It is noted that only head motion is tracked in this configuration A.

According to one embodiment of configuration A, the relative position and orientation between the sensing unit and the user's head do not change during the tracking session. As long as this condition is met, there is no restriction on the position and orientation of the sensing unit relative to user's head. This provides the user flexibilities about where to put the sensing unit.

The orientation quaternion qhg of CS-H in CS-G can be obtained through a calibration procedure.

The system works in tracking mode after the calibration. Details on how head tracking mode works will be described later. At any time, the CS-W can be re-aligned with the current head orientation to get CS-W2. This can provide the user an intuitive self-centered view.

Besides the user's head, the sensing unit can be mounted on a wide range of object such as a display, a camera, a drone etc. for motion tracking. Its tracking mode works in the same way as described for the head tracking mode.

Figure 4:
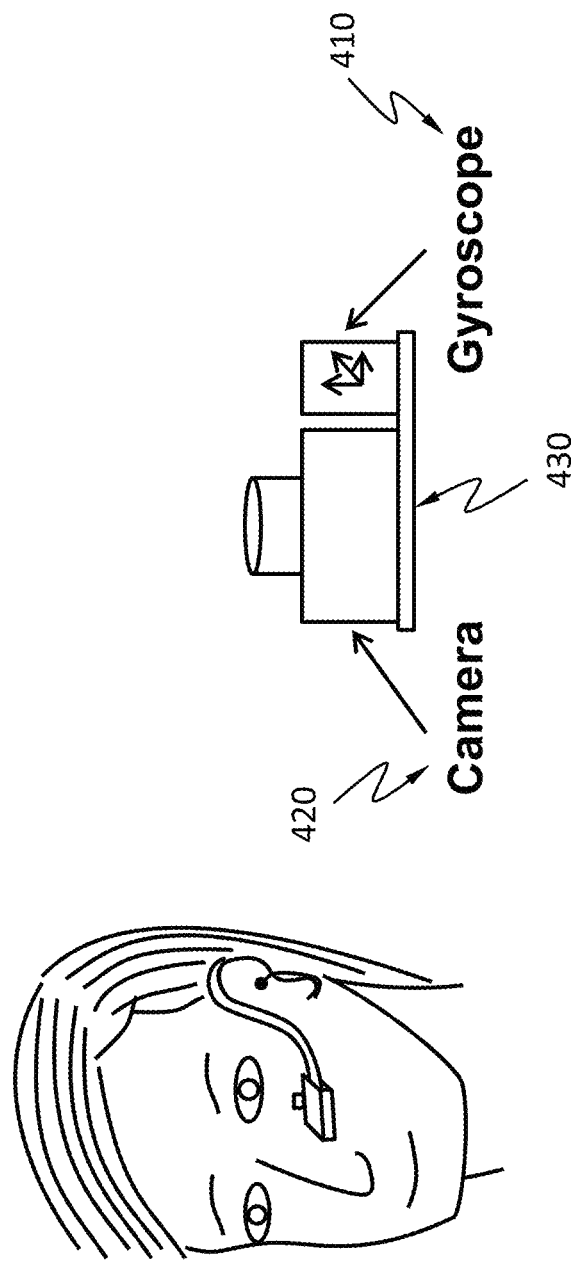
FIG. 4 illustrates an exemplary tracking system that comprises a gyroscope and a camera both attached to a rigid frame, according to an embodiment of the present teaching.

As shown in FIG. 4, in configuration B, the sensing unit has a gyroscope 410 and a camera 420. They may be attached to a rigid frame 430 so that their relative position and orientation do not change in all time, as shown in FIG. 4. In this configuration B, both head and eye motions can be tracked when it works in tracking mode. In general, as long as the relative position and orientation between the gyroscope 410 and the camera 420 do not change during a given tracking session, the system will work. A new tracking session may begin when the sensing unit is first put on or its position or orientation changes. A calibration may be needed before such a new tracking session in order to obtain the relative position between an eye and the imaging sensor and the relative orientation between the head and gyroscope. These calibration procedures are described later.

According to one embodiment of configuration B, the orientation quaternion qcg of CS-C in CS-G is known. qcg can be obtained through a calibration procedure described later.

The sensing unit may be worn by the user and is positioned in front of one or both of the eyes with some kind of headgear. In general, as long as the relative position and orientation between the sensing unit and the user's head do not change during a given tracking session, the system will work however the user positions the sensing unit.

There is no restriction on the position and orientation of the sensing unit relative to the head or an eye as long as the center area of the eye falls in the field of view of the camera. This can provide flexibilities for the user to decide where to put the sensing unit.

The orientation quaternion qcg of CS-H in CS-G and the coordinates vec of the origin of CS-E in the CS-C may be obtained through calibration procedures. These calibration procedures are described in later.

After calibrations, the system works in tracking mode. It may track the orientations of the head and eyeball independently. At any time, the CS-W can be re-aligned with the current orientation of CS-H and get CS-W2. In addition, at any time, CS-E can be re-aligned with the current orientation of CS-H and get CS-E1. This can provide the user an intuitive self-centered view and can help to reset possible measurement errors occurred in the system.

As head and eye motion are tracked independently, a set of head/eye gestures can be defined and detected. For example, a stare condition may be detected if the user fixes the gaze point on a target. Depending on the motions of the head under a stare condition, a set of head gesture can be detected including head nod, head shake, and head bobble. Furthermore, the combination of these gestures can form new complex gestures.

Figure 5:
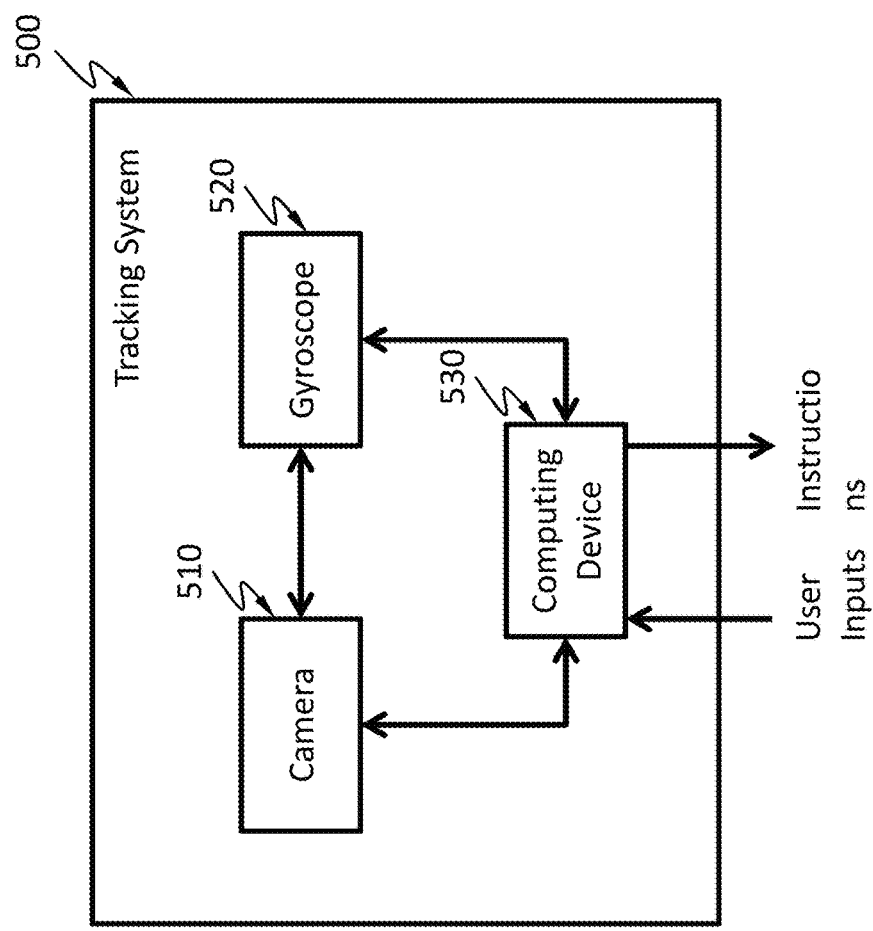
FIG. 5 illustrates an exemplary diagram of a tracking system described herein, according to an embodiment of the present teaching.

FIG. 5 illustrates an exemplary diagram of a tracking system 500 described herein, according to an embodiment of the present teaching. As shown in FIG. 5, the tracking system 500 includes a camera 510, a gyroscope 520, and a computing device 530. It can be understood that according to different configurations, the tracking system may include only a gyroscope without a camera.

In this example, the camera 510 may capture and record an image of an object, e.g. one or two eyes of a user. During both calibration and tracking modes, the camera 510 may help to determine an orientation of an eye of the user relative to the tracking system 500, or relative to the gyroscope 520. It can be understood that the camera 510 may be generalized to any imaging sensor that can capture and record an image of an object.

The camera 510 may receive a request from the computing device 530 for an eye image, and send the captured eye image to the computing device 530 for calibration and/or tracking of eye motions and orientation.

The gyroscope 520 in this example is coupled to the camera 510 such that the relative position and orientation between the camera 510 and the gyroscope 520 are fixed during each tracking session. For example, the camera 510 and the gyroscope 520 may be stick together or connected via a rigid frame. In general, the gyroscope 520 can be any spatial orientation sensor, which is a sensor that measures its orientation in 3D space. The spatial orientation sensor can be either a mechanical or an electronic device. A gyroscope's output can be in one of several formats, such as a 3 by 3 matrix, Euler angles or quaternion etc. The gyroscope 520 may generate outputs during movements of a head and/or an eye of the user.

The gyroscope 520 may receive a request from the computing device 530 for orientation information of the head, an eye, and/or the camera 510, and send the orientation information to the computing device 530 for calibration and/or tracking of head and eye motions and gesture.

The computing device 530 in this example may receive user inputs from the user, and determine a working mode, which may be a calibration or tracking mode, based on the user inputs. During either mode, the computing device 530 may send request to the camera 510 and/or the gyroscope 520 for image and orientation information respectively. After obtaining the eye image and orientation information of the head and/or the camera 510, the computing device 530 may perform head/eye calibration, head/eye tracking, and/or gesture determination, based on various algorithms.

In one embodiment, after determining a gesture based on the user's head/eye motion, the computing device 530 may generate and provide an instruction to a corresponding device. For example, the user may perform the gesture to trigger the instruction to control a device like a headset used in VR, AR, self-driving vehicle, AI learning machine, etc.

Figure 6:
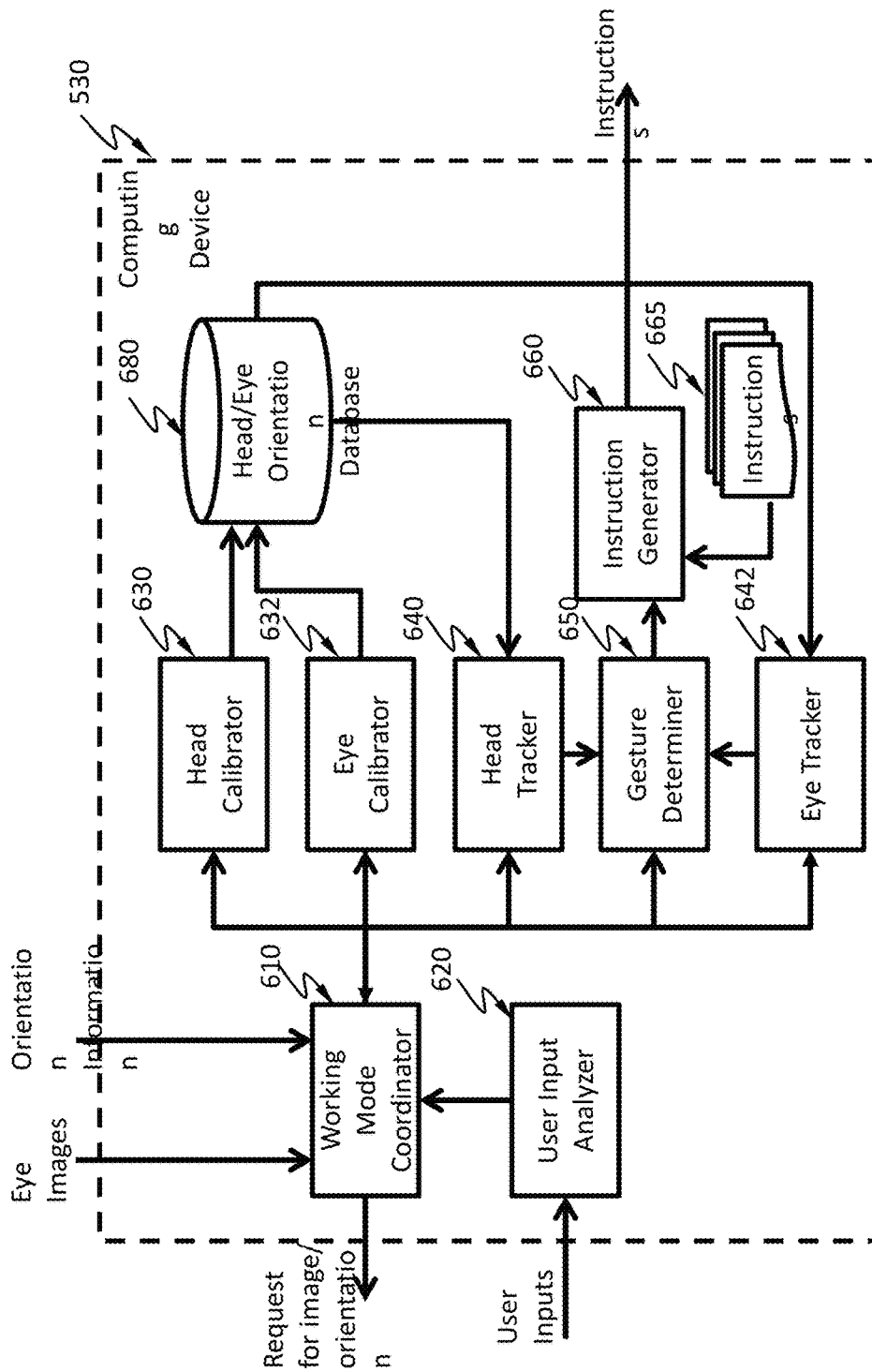
FIG. 6 illustrates an exemplary diagram of a computing device in a tracking system described herein, according to an embodiment of the present teaching.

FIG. 6 illustrates an exemplary diagram of a computing device 530 in a tracking system described herein, according to an embodiment of the present teaching. As shown in FIG. 6, the computing device 530 in this example includes a working mode coordinator 610, a user input analyzer 620, a head calibrator 630, an eye calibrator 632, a head tracker 640, an eye tracker 642, a gesture determiner 650, an instruction generator 660, instructions 665, and a head/eye orientation database 680.

The user input analyzer 620 in this example may receive user inputs from a user of the tracking system. For example, the user inputs may come from a button, a switch, or a touch screen on the tracking system. The user inputs may indicate the user wants to turn on/off of the tracking system, manually turn the tracking system to a specific working mode, and/or provide some parameters for the calibration and tracking. The user input analyzer 620 may analyze these inputs and provide corresponding information to the working mode coordinator 610 for working mode coordination.

The working mode coordinator 610 in this example can determine a working mode. The working mode may be one of: head calibration, eye calibration, head tracking, eye tracking, and gesture determination. The determination of a working mode may be based on the user inputs or a predetermined setup. For example, the system may automatically enter head tracking mode after the head is calibrated, and automatically enter eye tracking mode after an eye is calibrated.

For each working mode, the working mode coordinator 610 may send a corresponding request to the camera 510 and/or the gyroscope 520 for eye images and orientation information respectively. The working mode coordinator 610 can receive the eye images from the camera 510 and the orientation information from the gyroscope 520, and forward the eye images and orientation information to a corresponding unit based on the determined working mode.

In one example, the working mode is determined to be head calibration by the working mode coordinator 610. The working mode coordinator 610 may forward head orientation information to the head calibrator 630 for head calibration. The head orientation information comes from outputs of the gyroscope 520.

In another example, the working mode is determined to be eye calibration by the working mode coordinator 610. The working mode coordinator 610 may forward eye images and camera orientation information to the eye calibrator 632 for eye calibration. The camera orientation information comes from outputs of the gyroscope 520.

In yet another example, the working mode is determined to be head and eye combined calibration by the working mode coordinator 610. The working mode coordinator 610 may then forward head orientation information to the head calibrator 630 for head calibration and eye images and camera orientation information to the eye calibrator 632 for eye calibration.

Details about calibration according to various embodiments are described below.

As discussed above, configuration A has only a gyroscope in the sensing unit for tracking the orientation of an object, e.g. the head of the user. The calibration procedure for obtaining the orientation quaternion qog of CS-O in CS-G is generic for any object that has a gyroscope attached to it. The "object" here can refer to the user's head, a camera, a display etc., depending on the applications.

In one embodiment, the user head is calibrated. By rotating the head along any 2 of the 3 axes of CS-H, the orientation quaternion qhg of CS-H in CS-G can be obtained.

In one calibration procedure, the user first moves the head up and down (about its X axis) such that the head calibrator 630 can record the gyroscope outputs during the movements. Then the user moves the head left and right (about its Y axis) such that the head calibrator 630 can record the gyroscope outputs in the movements as well. This combination of head movements, i.e. first along X axis and then alone Y axis, can be named as M-XY.

Similarly, other combinations of rotations about any 2 of the 3 axes can be used as calibration procedure and achieve the same goal. In summary, all of the possible combinations are M-XY, M-XZ, M-YX, M-YZ, M-ZX, M-ZY, with first letter denoting the name of the axis to first rotate about, second letter denoting the name of the axis to rotate about secondly.

A 3D rotation vector aligned with the axis about which the user head is rotating can be calculated using the gyroscope raw outputs quaternions relative to its CS-W0. Knowing the initial and final orientations quaternion q0 and q1, the difference quaternion qx_dif between them during the rotations can be calculated.

A 3D rotation unit vector vx can be obtained from q_dif.

Repeat the procedure on Y or Z axis, one can get vy or vz. As a result, vx vy and vz are the vectors aligned with the X, Y and Z axes of the CS-H in CS-G. X, Y and Z axes may be orthogonal, i.e. perpendicular, to each other. Knowing any 2 of them, the third can be derived. Therefore, having any 2 of vx, vy and vz, the orientation quaternion qhg can be obtained.

A detailed implementation for calculating quaternion qhg can be found in Algorithms section.

As discussed above, the system according to configuration B has a gyroscope and a camera in the sensing unit, as shown in FIG. 5. The gyroscope and the camera can work together to track head, camera orientation, and the movements of the eyeball.

The following may be obtained by following the calibration procedures:
Camera, the orientation quaternion qcg of CS-C in CS-G,
Head, the orientation quaternion qhg of CS-H in CS-G,
Eye, the coordinates vec of the origin of CS-E in CS-C.

Camera calibration is described below.

Calibrating a camera is to obtain the camera orientation quaternion qcg of CS-C in CS-G. This is a special case of calibrating an object's CS-O in CS-G. As such, this can be performed by the head calibrator 630 only once when the camera is first coupled with the gyroscope. Some extra steps may be taken. First, 2 markers need to be set in front of the camera. The line connecting the 2 markers needs to be parallel to the X axis of CS-C. In addition, a display for camera frame may be needed during the calibration procedure. Furthermore, 3 evenly spaced horizontal lines are to be drawn on top of each camera captured frames on the screen. The middle line is in the middle of the screen. Their positions do not change. A sequence of movements needs to be applied to the camera as shown in FIG. 7.

Figure 7:
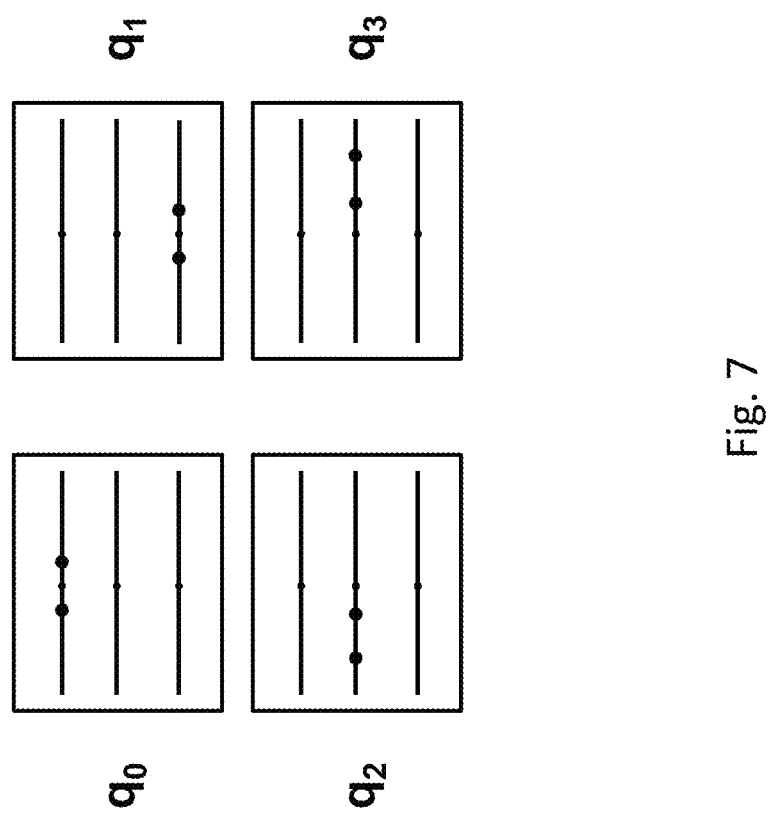
FIG. 7 illustrates a sequence of movements to be applied to the camera during a camera calibration mode, according to an embodiment of the present teaching.

As shown in FIG. 7, the camera needs to be oriented 4 times to meet certain criteria:

Step 1: the camera is oriented to an orientation so that the image of the 2 markers sit in the middle of the top line, and the raw quaternion output q0 of the gyroscope is obtained. Step 2: the camera is oriented to an orientation so that the image of the 2 markers sit in the middle of the bottom line, and the raw quaternion output q1 of the gyroscope is obtained. Step 3: the camera is oriented to an orientation so that the image of the 2 markers sit in the left side of the middle line, and the raw quaternion output q2 of the gyroscope is obtained. Step 4: the camera is oriented to an orientation so that the image of the 2 markers sit in the right side of the middle line, and the raw quaternion output q3 of the gyroscope is obtained.

It can be understood that the order of these 4 steps is not important, i.e. they can be performed in different orders in any combination.

Knowing q0, q1, a2 and q3, the camera orientation quaternion qcg of CS-C in CS-G can be obtained the same way as the general methods of obtaining the orientation quaternion of an CS-O in CS-G as described in Algorithms section.

In addition, the focal length of the camera can also be obtained as described in Algorithms section.

This camera calibration only needs to be done once for a given sensing unit.

Head calibration in configuration B is to obtain the orientation quaternion qhg of CS-H in CS-G. It needs to be performed for each tracking session when the sensing unit is first put on or its position or orientation changes. Head calibration can be done alone as described for configuration A, or it can be combined with eye calibration as described below.

Eye calibration in configuration B is to obtain the coordinates vec of the origin of CS-E in CS-C. It needs to be performed for each tracking session when the sensing unit is first put on or its position or orientation changes. Eye calibration can be done alone or it can be combined with the head calibration. The eye calibrator 632 in FIG. 6 may perform both eye only calibration and a combined calibration together with the head calibrator 630.

In one embodiment, before eye calibration, camera orientation quaternion qcg of CS-C in CS-G has been obtained through camera calibration as described above.

During eye calibration, the camera captures the images of the user's eye. In the meantime, the gyroscope measures the orientation of the camera. Both of the eye images from the camera and raw orientation quaternions from the gyroscope may be time stamped using a master clock. The samples are paired by choosing the images and quaternions that are closest in time.

In eye only calibration procedure, the user is instructed to perform a sequence of head and eye motions in order to get the right combination of gyroscope and camera sample data. The user should pick a gaze point at a distance and stare at it. A gaze point is where the user's eye is staring at. Without losing eye focus on that gaze point, the user turns the head.

When performing eye only calibration, it is not required where exactly the gaze point is. It is not required what kind of motion the head has. It is recommended the distance from gaze point to the center of the eye is much longer than the possible local translations of the center of the eye when performing the sequence of head and eye motions.

During the eye calibration, the user maintains a fixed gaze line. A gaze line is the line starting from the center of the eyeball, passing the center of the pupil and landing on the gaze point.

Figure 12:
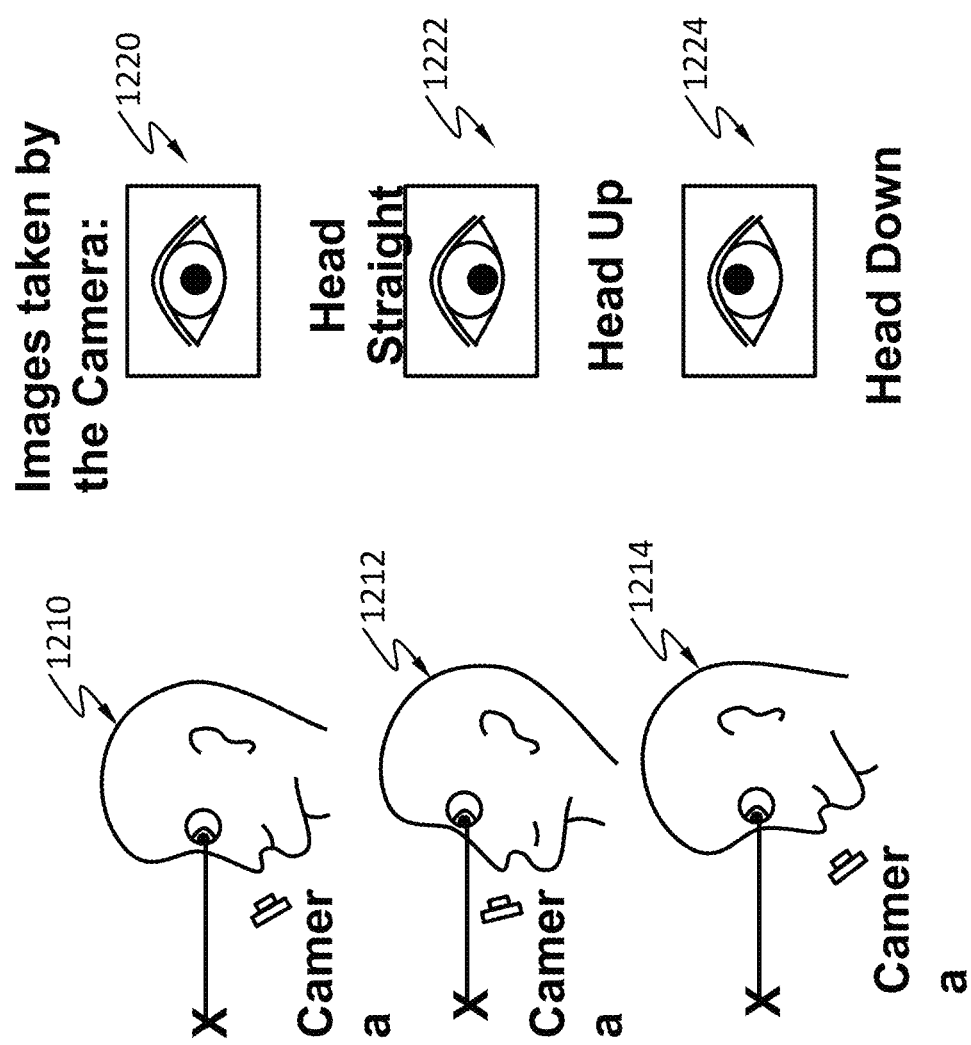
FIG. 12 illustrates that during the eye calibration, from a left side view of the user's head, the user maintains a fixed gaze line, such that while the head turns up or down, left or right, in order to maintain a fixed gaze line, the eye compensates in the opposite direction, according to an embodiment of the present teaching.

As shown in FIG. 12, in one example, while the head turns up or down in order to maintain a fixed gaze line, the eye compensates in the opposite direction, such that in all three scenarios 1210, 1212, 1214, the eye pupil should be always pointing to the same direction. But the eye ball position in the images 1220, 1222, 1224 taken by the camera should be different in the three scenarios.

Figure 13:
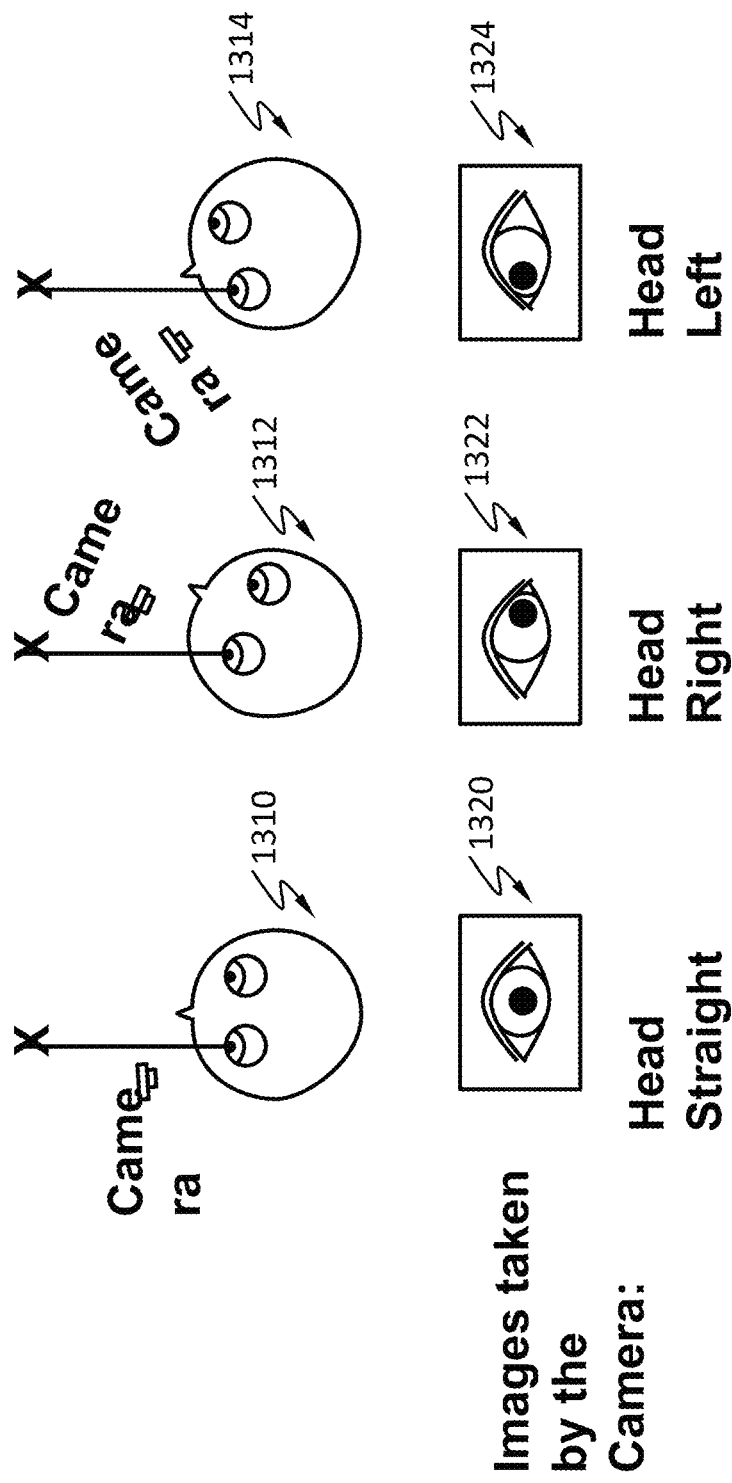
FIG. 13 illustrates that during the eye calibration, from a top view of the user's head, the user maintains a fixed gaze line, such that while the head turns up or down, left or right, in order to maintain a fixed gaze line, the eye compensates in the opposite direction, according to an embodiment of the present teaching.

Similarly, as shown in FIG. 13, in one example, while the head turns left and right in order to maintain a fixed gaze line, the eye compensates in the opposite direction, such that in all three scenarios 1310, 1312, 1314, the eye pupil should be always pointing to the same direction. But the eye ball position in the images 1320, 1322, 1324 taken by the camera should be different in the three scenarios.

The gyroscope and camera in the sensing unit move with the head during the calibration. They capture pairs of sample data that comprise the raw orientation quaternion of the gyroscope and the image of center area of the eye respectively.

These pairs of sample data of raw orientation quaternions and eye images are time stamped and recorded during this procedure. It is noted that during eye only calibration, there is no dependency on the orientation of the head.

Three pairs of sample data are sufficient to calculate the coordinates vec of the origin of CS-E in the CS-C. More pairs of sample data can be used to improve accuracy and robustness.

For each captured eye image, the coordinates of the eye pupil center xy=(x, y) are obtained through image processing. As a result, each pair of camera orientation and eye pupil position data can be represented as (qi, xyi), where:

qi is the raw output quaternion of the gyroscope,
xyi=(xi, yi) are the coordinate of the eye pupil center,
i is the index of the sample data pairs.

The result is the coordinates vec of the origin of CS-E in CS-C. The detailed on calculating vec is in Algorithms section.

A combined head and eye calibration can be performed with a different sequence of head and eye motions.

In one embodiment, the user can pick a gaze point at a distance. Without losing eye focus of that gaze point, the user turns the head according to the procedure described above for head only calibration, i.e. up and down, left and right for one calibration procedure.

At least 4 pairs of sample data (qi, xyi) can be obtained in this procedure. Therefore, the orientation quaternion qhg of CS-H in CS-G can be obtained using methods describe above for configuration A, and in the same time, the coordinates vec of the origin of CS-E in the CS-C can be obtained using method describe for eye only calibration.

It is time saving and more intuitive to user that the head and eye calibration can be done in one procedure.

In one embodiment, after head calibration and/or eye calibration, the head calibrator 630 and the eye calibrator 632 may store calibrated information to the head/eye orientation database 680 for future tracking. The head/eye orientation database 680 may store calibrated information for multiple users that have used the tracking system. For example, for each user, after head calibration, the head/eye orientation database 680 may store qhg for the user, i.e. the quaternion representing the orientation of CS-H of the user in CS-G of the gyroscope 520. After camera calibration, the head/eye orientation database 680 may store qcg, quaternion representing the orientation of CS-C of the camera 510 in CS-G of the gyroscope 520. In addition, after eye calibration, the head/eye orientation database 680 may store vec and vgc for each user; vec represents coordinates of the origin of CS-E of the user's eye in CS-C of the camera 510; vgc represents the gaze vector that pointing from the origin of CS-E of the user's eye, through the center of eye pupil of an eye, to the object the user is looking at in the CS-C of the camera 510 under the condition that the user can fit the sensing unit back to the same position and orientation relative to user's head and eye. Otherwise, a new round of head and eye calibrations may to be performed.

It is noted that results from head and eye calibrations may be only useful if the user does not move the apparatus. If the user takes it off and puts it back, there is a good chance that the sensing unit's position and orientation relative to the user's head and eye will change. Accordingly, in one embodiment, the system constantly updates the results from head and eye calibrations stored in the head/eye orientation database 680. In another embodiment, the head/eye orientation database 680 does not store the results from head and eye calibrations.

Referring back to FIG. 6, after the working mode coordinator 610 determines that the working mode is head tracking or eye tracking, the working mode coordinator 610 may obtain orientation information and eye images from the gyroscope 520 and the camera 510 respectively, and forward them to the head tracker 640 for head tracking and to the eye tracker 642 for eye tracking.

For head tracking in configuration A, where only head motion is tracked with a gyroscope, assuming the qhg is obtained and stored in the head/eye orientation database 680 using calibration procedure described above. The orientation of the head in CS-W2 can be obtained using methods described above.

To be specific, assuming the CS-W2 is aligned with the initial orientation of the CS-H. qgr is the gyroscope's raw output quaternion, qgr0 is the gyroscope's raw output quaternion when the head is at its initial orientation.

The orientation quaternion qhw can be calculated:

$$qhw = q\_prd4(qhg\_cnj, qgr0\_cnj, qgr, qhg)$$

where:

$$qgr0\_cnj = q\_cnj(qgr0)$$

$$qhg\_cnj = q\_cnj(qhg)$$

The ability to allow user to re-align CS-W2 with CS-H at any time can provide the user an intuitive self-centered view.

It can be understood that head tracking in configuration B may be performed by the head tracker 640 in a similar way as that for configuration A.

Eye tracking in configuration B can be performed by the eye tracker 642. It is assumed the following calibrations are done: camera calibration, head calibration, and eye calibration.

Eye tracking may include several steps as below.

In a first step, eye tracking includes calculating a gaze vector in camera coordinate system. It is assumed that the following are known and can be obtained from the head/eye orientation database 680:

qcg
vec=(xc, yc, zc) coordinate of the origin of CS-E in CS-C
vgc=(xg, yg, zg) the gaze vector that pointing from the origin of CS-E, through the center of eye pupil, to the object user is looking at in the CS-C.

Details on calculating vgc are in Algorithms section.

In a second step, eye tracking includes calculating a gaze quaternion in head coordinate system. In a head and eye tracking session, the CS-H rotates relative to CS-W2. The CS-E rotates relative to CS-C. It is required that CS-C does not rotate relative to CS-H.

Assuming qhg and qcg are known through head and camera calibrations and can be obtained from the head/eye orientation database 680. vgc=(xg, yg, zg) is the gaze vector in the CS-C calculated in the first step above.

Let qc2h be the quaternion of CS-C in CS-H:

$$qc2h = q\_prd2(qhg\_cnj, qcg)$$

where $$qhg\_cnj = q\_cnj(qhg)$$

Let vgh be the gaze vector in CS-H $$vgh = qvq\_trans(qc2h, vgc)$$

Once vgh is known, quaternion qeh representing the CS-E in CS-H can be calculated under the following 2 conditions: vgh points to the negative direction of the Z axis of CS-E. The X axis of CS-E is parallel to the P-ZX plane of CS-H. Details on calculating qeh are in the Algorithms section.

In a third step, eye tracking includes calculating a gaze Quaternion in world coordinate system. Knowing gaze quaternion qeh in CS-H in the second step, the gaze quaternion qgw in CS-W2 can be obtained:

$$qew = q\_prd3(qhw, qeh0\_cnj, qeh)$$

where:

$$qeh0\_cnj = q\_cnj(qeh0)$$

qeh0 is the initial gaze quaternion in CS-H that the user can use to align the CS-E with CS-H and get CS-E1.

The ability to allow user to re-align CS-E with CS-H and get CS-E1 at any time can provide the user an intuitive self-centered view and also help to reset possible measuring errors.

Referring back to FIG. 6, after the head tracker 640 and the eye tracker 642 perform head and eye tracking, they can send the head and eye orientation information, e.g. qhw and qew, of the user being tracked to the gesture determiner 650 for determining a gesture or gesture combination of the user.

Knowing qew and qhw, a set of head and eye gestures can be detected by the gesture determiner 650. This can be triggered by the working mode gesture determination from the working mode coordinator 610 or by a predetermined setup such that the gesture determination may be automatically performed after the head/eye tracking.

A stare condition happens when a gaze vector is limited in a small range over a period of time.

Let vgw be the gaze vector in CS-W2

$$vgw = qvq\_trans(qhw, vgh)$$

where:
vgh is obtained in the second step of eye tracking.

The average and variance of vgw over a period of time can be used for detecting a stare condition. If the average and variance are within their thresholds, a stare condition happens.

When head rotates about it is X axis, head nod gesture is detected. In one embodiment, the head nod gesture also includes that a stare condition is true.

When head rotates about it is Y axis, head shake gesture is detected. In one embodiment, the head shake gesture also includes that a stare condition is true.

When head rotates about it is Z axis, head bobble gesture is detected. In one embodiment, the head bobble gesture also includes that a stare condition is true.

For the gesture described above, head/eye gesture can be further divided in 4 states on each axis:
G-MP: Turning to positive direction
G-MN: Turning to negative direction
G-SP: Reaching furthest position in positive direction
G-SN: Reaching furthest position in negative direction.

The combination of the above 4 states at any one of the X, Y and Z axes can form new gestures, based on various applications.

The gesture determiner 650 may send the determined gesture and/or gesture combinations to the instruction generator 660 for generating one or more instructions.

The instruction generator 660 in this example may generate an instruction based on each gesture or gesture combination determined by the gesture determiner 650. The instruction generator 660 may provide the generated instruction to a machine as an input of the user giving the gesture or gesture combination.

In one embodiment, the instruction generator 660 may select one of the instructions 665 based on a predetermined mapping function that maps each gesture and/or gesture combination to an instruction.

For example, the following sequences (gesture combination) of head motion about X axis can be used to simulate mouse down and mouse up events or up and down arrow key events:

G-MP->G-SP->G-MN==>Mouse up or up arrow key,
G-MN->G-SN->G-MP==>Mouse down or down arrow key.

More gestures can be similarly defined and detected along each of the axes.

In one example, the instruction generator 660 may provide an instruction corresponding to a selection of an item by the user in VR, AR or AI related applications, when the user has a stare condition at the item and a head nod at the same time.

In another example, the instruction generator 660 may provide an instruction corresponding to a de-selection of an item by the user in VR, AR or AI related applications, when the user has a stare condition at the item and a head shake at the same time.

In another example, the instruction generator 660 may provide an instruction corresponding to a zoom in/out of an item by the user in VR, AR or AI related applications, when the user has a stare condition at the item and a head bobble at the same time.

In one embodiment, there is no more gyroscope in the tracking system 500 other than the gyroscope 520, and there is no more camera or imaging sensor in the tracking system 500 other than the camera 510.

Figure 8:
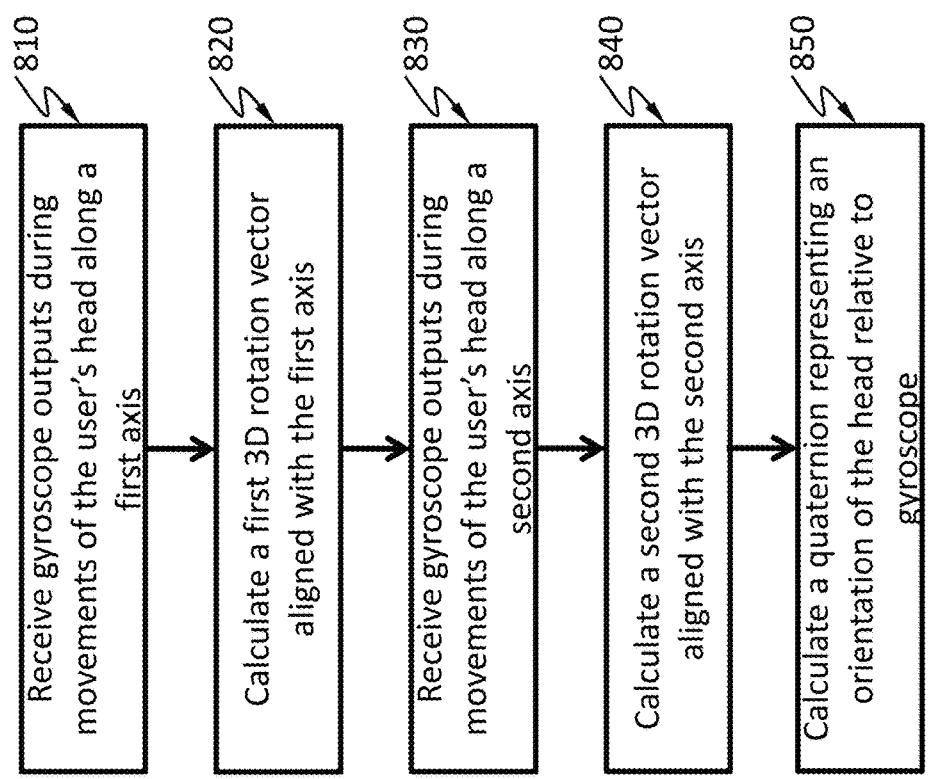
FIG. 8 shows a flow chart of an exemplary process for a head calibration, according to an embodiment of the present teaching.

FIG. 8 shows a flow chart of an exemplary process for a head calibration, according to an embodiment of the present teaching. In one embodiment, the process may be performed by the head calibrator 630 as shown in FIG. 6.

At 810, gyroscope outputs are received during movements of the user's head along a first axis. A first 3D rotation vector aligned with the first axis is calculated at 820. At 830, gyroscope outputs are received during movements of the user's head along a second axis that is orthogonal to the first axis. A second 3D rotation vector aligned with the second axis is calculated at 840. A quaternion representing an orientation of the head relative to gyroscope is calculated at 850.

Figure 9:
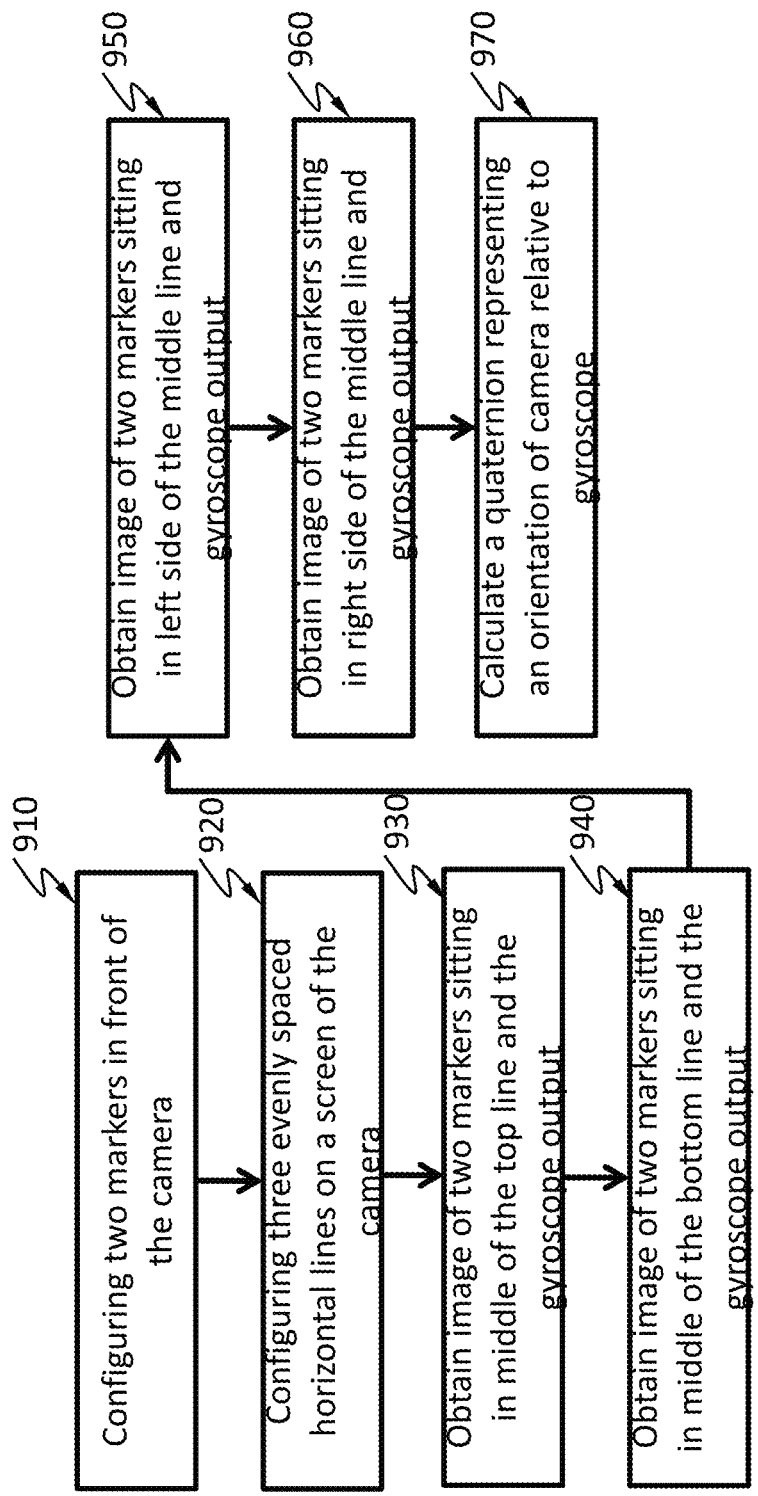
FIG. 9 shows a flow chart of an exemplary process for a camera calibration, according to an embodiment of the present teaching.

FIG. 9 shows a flow chart of an exemplary process for a camera calibration, according to an embodiment of the present teaching. In one embodiment, the process may be performed by the head calibrator 630 as shown in FIG. 6.

Two markers are configured at 910 in front of the camera. Three evenly spaced horizontal lines are configured at 920 on a screen of the camera. A first image of the two markers sitting in middle of the top line and a corresponding gyroscope output are obtained at 930. A second image of the two markers sitting in middle of the bottom line and a corresponding gyroscope output are obtained at 940. A third image of the two markers sitting in left side of the middle line and a corresponding gyroscope output are obtained at 950. A fourth image of the two markers sitting in right side of the middle line and a corresponding gyroscope output are obtained at 960. A quaternion is calculated at 970 representing an orientation of camera relative to the gyroscope.

Figure 10:
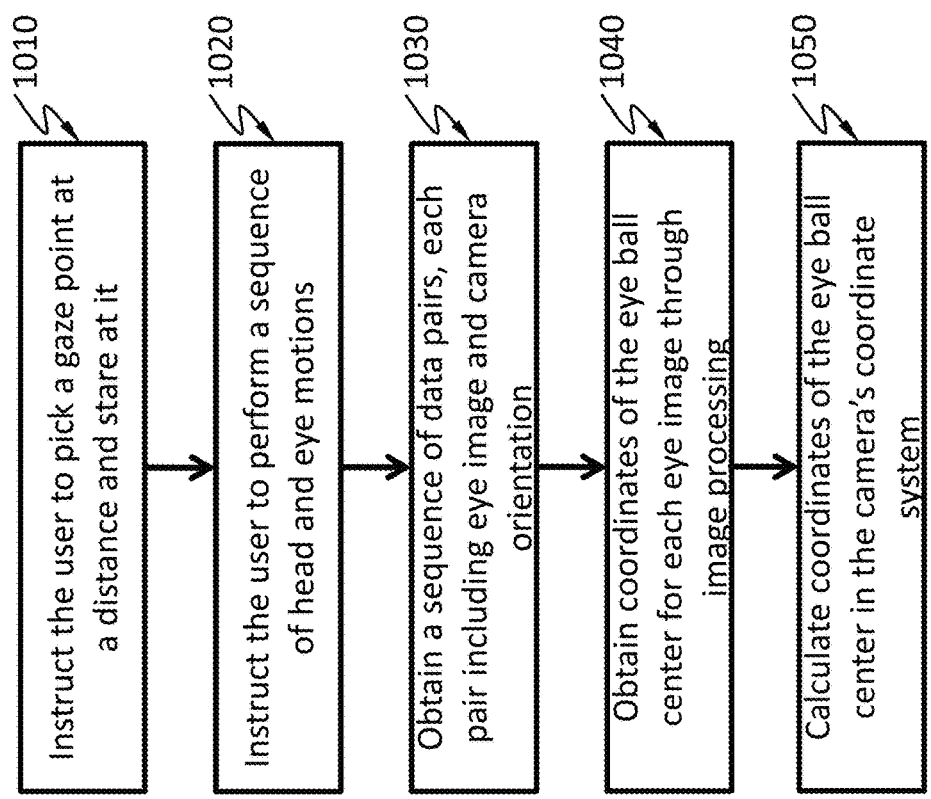
FIG. 10 shows a flow chart of an exemplary process for an eye only calibration, according to an embodiment of the present teaching.

FIG. 10 shows a flow chart of an exemplary process for an eye only calibration, according to an embodiment of the present teaching. In one embodiment, the process may be performed by the eye calibrator 632 as shown in FIG. 6.

At 1010, the user is instructed to stare at a gaze point at a distance. The gaze point may be picked by the user or predetermined by the system. The gaze point may be far enough from the user such that the distance from the gaze point to the center of the user's eye is much longer than the possible local translations of the center of the eye when the user performs a sequence of head and eye motions.

The user is instructed at 1020 to perform a sequence of head and eye motions. A sequence of data pairs is obtained at 1030. Each pair of data includes an image of an eye and orientation information from the gyroscope corresponding to the camera's status when capturing the eye image. Coordinates of the eye pupil center are obtained at 1040 for each eye image through image processing. Coordinates of the eye ball center in the camera's coordinate system are calculated at 1050.

Figure 11:
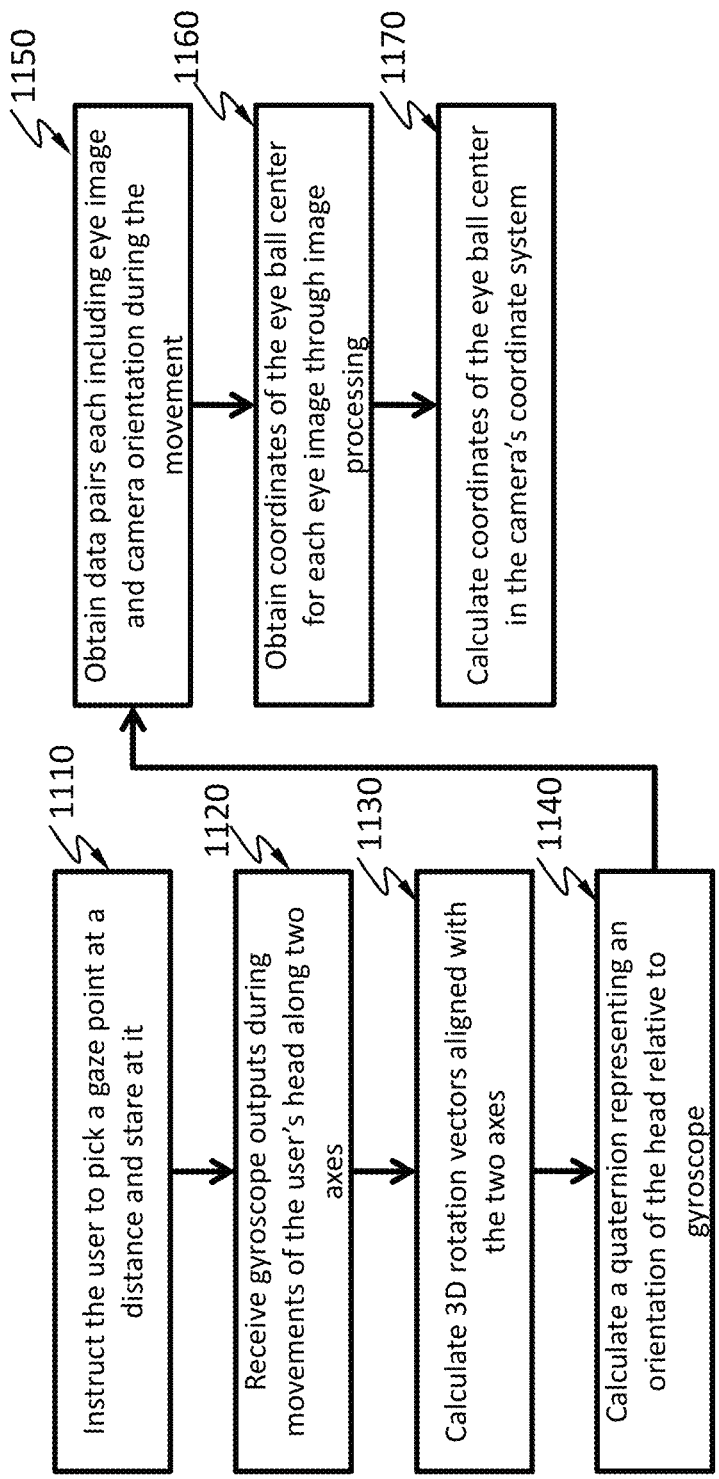
FIG. 11 shows a flow chart of an exemplary process for a head and eye combined calibration, according to an embodiment of the present teaching.

FIG. 11 shows a flow chart of an exemplary process for a head and eye combined calibration, according to an embodiment of the present teaching. In one embodiment, the process may be performed by the head calibrator 630 and the eye calibrator 632 as shown in FIG. 6.

The user is instructed at 1110 to stare at a gaze point at a distance. The gaze point may be picked by the user or predetermined by the system. The gaze point may be far enough from the user such that the distance from the gaze point to the center of the user's eye is much longer than the possible local translations of the center of the eye when the user performs a sequence of head and eye motions.

Gyroscope outputs are obtained at 1120 during movements of the user's head along two axes that are orthogonal to each other. 3D rotation vectors aligned with the two axes are calculated at 1130. A quaternion representing an orientation of the head relative to gyroscope is calculated at 1140.

A sequence of data pairs is obtained at 1150. Each pair of data includes an image of an eye and orientation information from the gyroscope corresponding to the camera's status when capturing the eye image. Coordinates of the eye pupil center are obtained at 1160 for each eye image through image processing. Coordinates of the eye ball center in the camera's coordinate system are calculated at 1170.

It can be understood that each orientation discussed according to FIG. 8, FIG. 9, FIG. 10, and FIG. 11 can be represented by a matrix or a vector rather than a quaternion. It can be understood that the order of the steps shown in each of FIG. 8, FIG. 9, FIG. 10, and FIG. 11 may be changed according to different embodiments of the present teaching.

Figure 14:
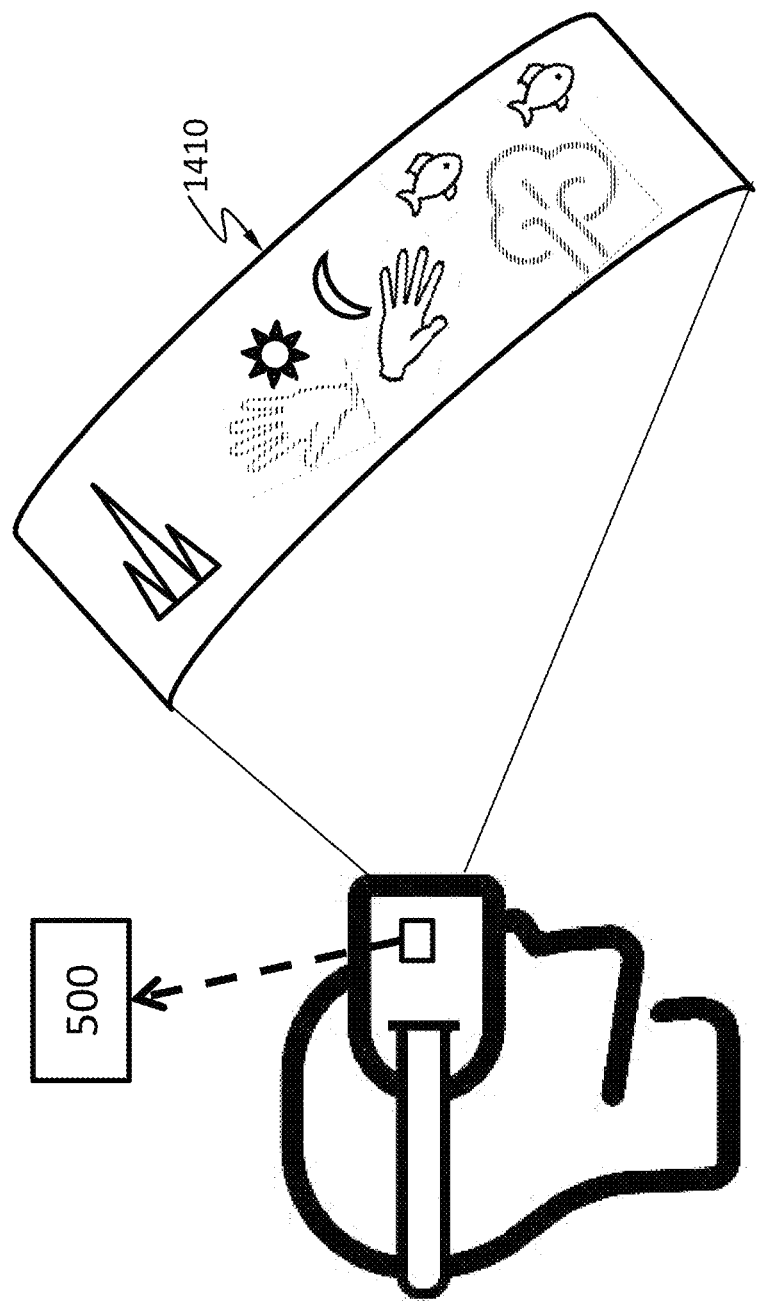
FIG. 14 schematically shows a system comprising the tracking system described herein suitable for a virtual reality application, according to an embodiment of the present teaching.

FIG. 14 schematically shows a system comprising the tracking system 500 described herein suitable for a virtual reality (VR) application, according to an embodiment of the present teaching. The system may include a VR headset including the tracking system 500 to be worn by a user. While wearing the headset, the user can see an immersive VR screen 1410 in front of the user. The screen 1410 may include items not in reality. The user may perform operations on the items on the screen 1410 by performing head/eye gestures or gesture combinations as discussed above. In one embodiment, after the user changes a body position, e.g. from sitting up to lying down, the system may adjust its initial orientation setup for better tracking the user's head/eye motions and gestures.

Figure 15:
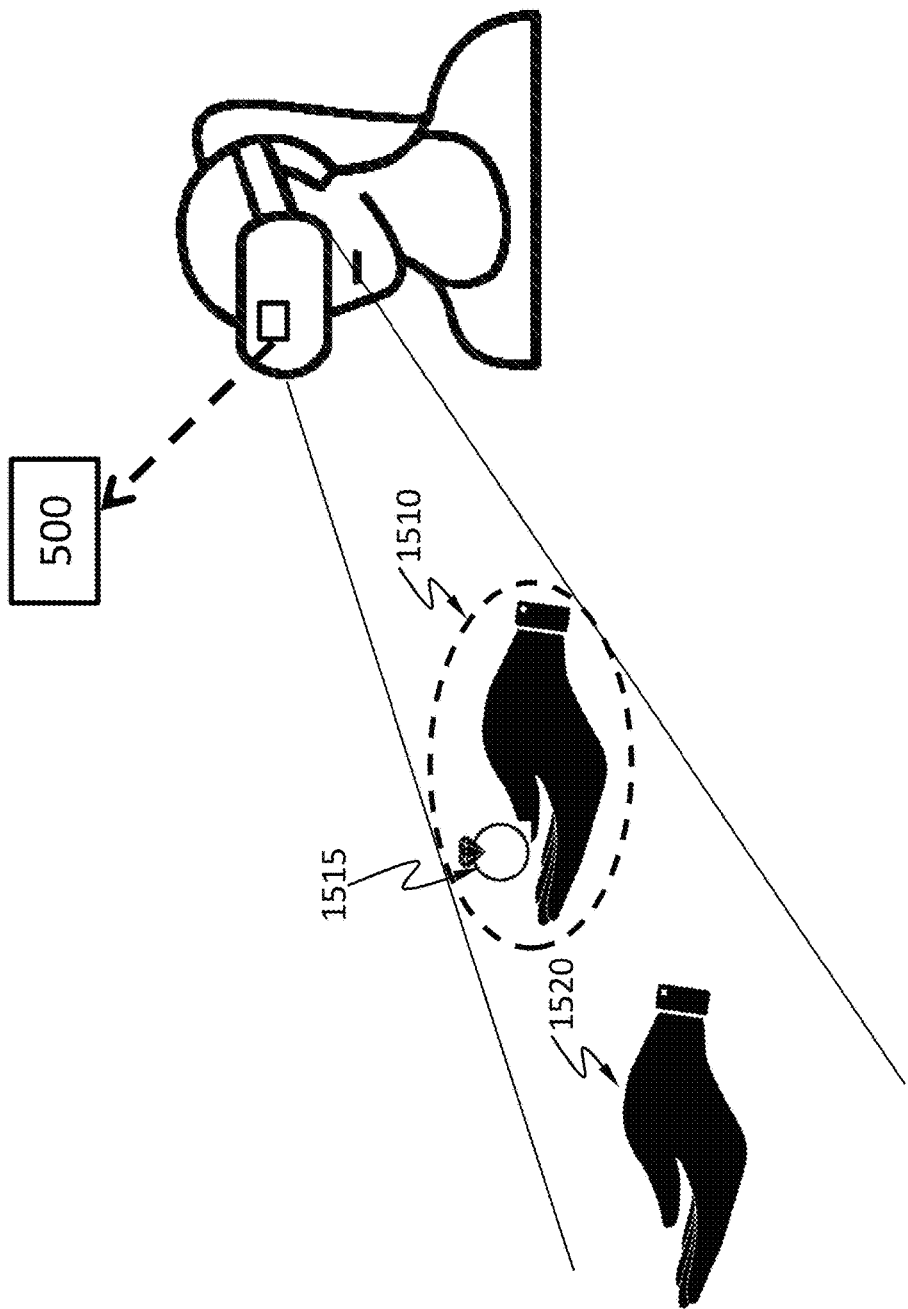
FIG. 15 schematically shows a system comprising the tracking system described herein suitable for an augmented reality application, according to an embodiment of the present teaching.

FIG. 15 schematically shows a system comprising the tracking system described herein suitable for an augmented reality (AR) application, according to an embodiment of the present teaching. The system may include an AR headset including the tracking system 500 to be worn by a user. While wearing the headset, the user can see an image 1510 which includes both real items 1520 and virtual items 1515 augmented to the real items. The augmented virtual items may be selected upon the user's request and/or based on the user's information or the features of the real items being augmented. The user may perform operations on the image by performing head/eye gestures or gesture combinations as discussed above. In one embodiment, after the user changes a body position, e.g. from sitting up to lying down, the system may adjust its initial orientation setup for better tracking the user's head/eye motions and gestures.

Figure 16:
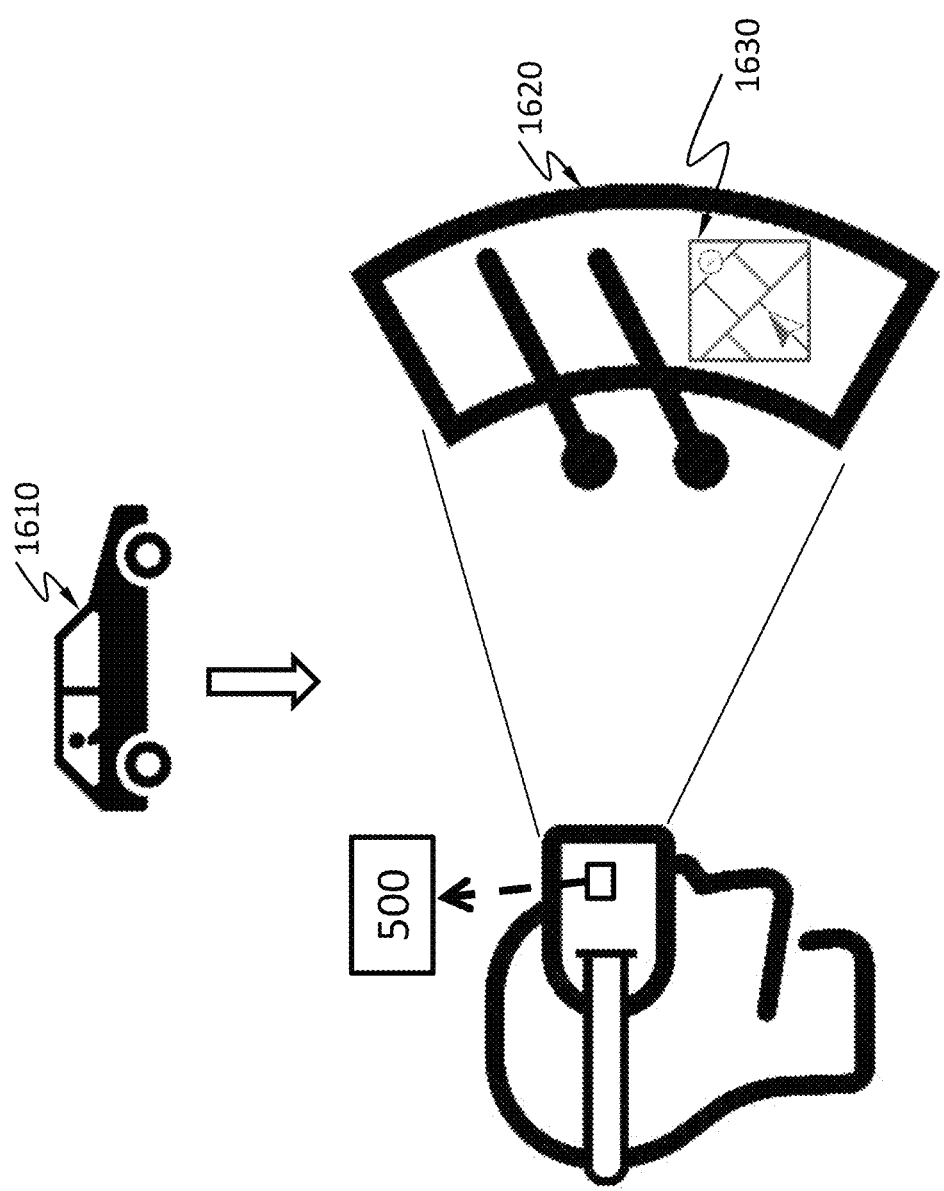
FIG. 16 schematically shows a system comprising the tracking system described herein suitable for implementing on a self-driving car, according to an embodiment of the present teaching.

FIG. 16 schematically shows a system comprising the tracking system described herein suitable for implementing on a self-driving vehicle 1610, according to an embodiment of the present teaching. The system may include an AR headset including the tracking system 500 to be worn by a user. While wearing the headset, the user can see an augmented image 1630 on top of or near the front window 1620 of the vehicle. For example, the augmented image 1630 may include a GPS map showing a route the self-driving vehicle 1610 is following. The user may perform operations on the GPS map by performing head/eye gestures or gesture combinations as discussed above. Based on the user operations on the GPS map, e.g. selecting an alternative route, the self-driving vehicle 1610 may adjust its operation accordingly. In one embodiment, after the user changes a body position, e.g. from sitting up to laying back, the system may adjust its initial orientation setup for better tracking the user's head/eye motions and gestures.

Figure 17:
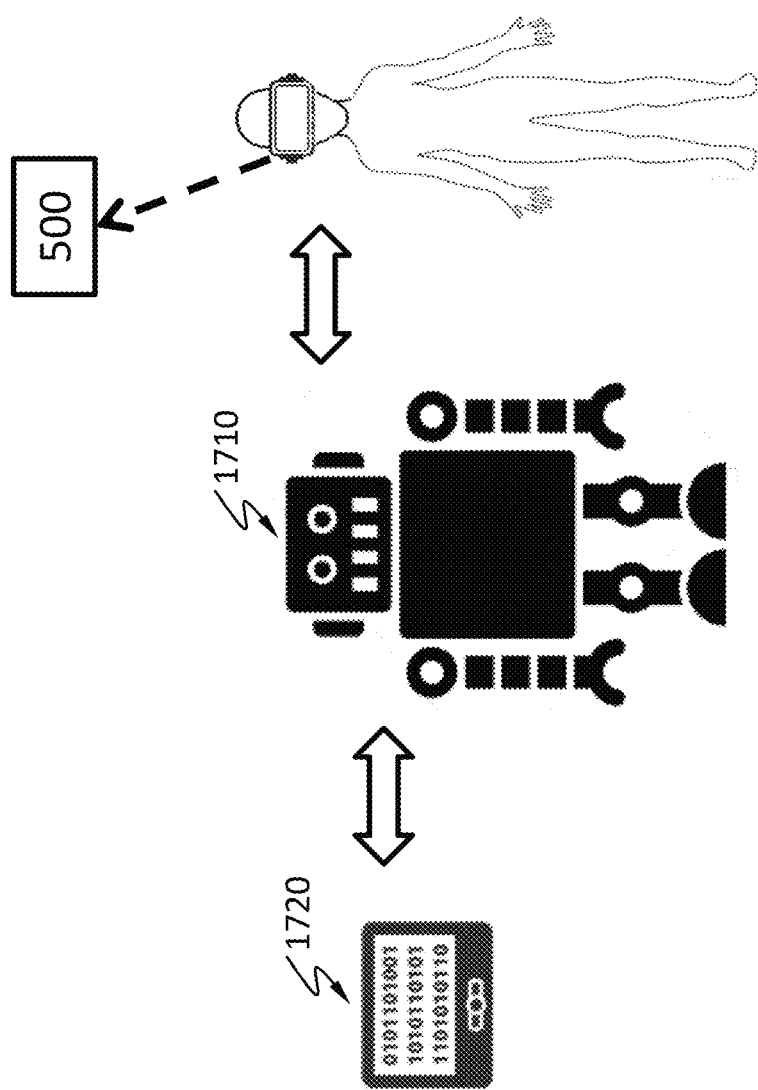
FIG. 17 schematically shows a system comprising the tracking system described herein suitable for implementing on an artificial intelligence that works with machine learning, according to an embodiment of the present teaching.

FIG. 17 schematically shows a system comprising the tracking system described herein suitable for implementing on an artificial intelligence that works with machine learning, according to an embodiment of the present teaching. The system may include a headset including the tracking system 500 to be worn by a user. While wearing the headset, the user can use head/eye gestures to control a development of artificial intelligence (AI) 1710 which may work together with a machine learning device 1720 in a cycle of learning, modeling and predicting. Quick and intuitive ways to track and confirm the user's attention point for data acquisition and confirmation via the system can play an important role in this loop.

In one embodiment, a system may comprise any wearable device coupled to the tracking system 500, wherein the system is configured for developing human machine interaction based on inputs from a user wearing the wearable device.

Algorithms

This section lists various exemplary algorithms used in accordance with various embodiments of the present teaching. Some mathematic tools used in these algorithms can be found in the Appendix section later.

C1. Obtaining the Orientation of an Object Relative to the Gyroscope

Assuming a gyroscope is attached to a rigid object for calibration. The goal is to get the orientation quaternion qog of CS-O in CS-G.

Coordinate systems are defined as above.

The gyroscope's raw quaternion output is relative to CS-W0.

CS-W1 is a CS-W aligned with the initial orientation of CS-G as described above.

In one calibration procedure, the object first rotate about its X axis of CS-O, getting its first and second raw orientation quaternion q0 and q1 about this axis. And then the object rotates about its Y axis of CS-O, getting its first and second raw orientation quaternion q2 and q3 on this axis. q0, q1, q2 and q3 are relative to CS-W0.

It can be proven that the quaternion qx_dif that represents the difference between 2 quaternion q0 one q1 are the same in either CS-W0 or CS-W1:

$$qx\_dif = q\_prd2(q0\_cnj, q1) = q\_prd2(q01\_cnj, q11)$$

where:

$$q0\_cnj = q\_cnj(q0)$$

$$q01\_cnj = q\_cnj(q01)$$

Assuming q00 is one initial orientation quaternion of CS-G in CS-W0, q01, q11 are q0, q1 in CS-W1

$$q01 = q\_prd2(q00\_cnj, q0)$$

$$q11 = q\_prd2(q00\_cnj, q1)$$ where:

$$q00\_cnj = q\_cnj(q00)$$

A unit quaternion can be interpreted as a rotation vector and an angle that rotates about this vector. Knowing the quaternion qx_dif that represent the orientation difference between q0 and q1, the rotation vector vx can be obtained from quaternion qx_dif using method in Appendix section. qx_dif can be interpreted as a transformation from q0 to q1.

vx can be regarded as the vector aligned with X axis of CS-O in CS-W1. Assuming vx0 to be (1, 0, 0) in CS-W1, then the quaternion qx that transforms vx to vx0 can be calculated.

An unit quaternion can be interpreted as a rotation vector and an angle that rotates about this vector. Assuming v_qx to be the vector part of qx, then v_qx is the cross product vector of vx to vx0. And assuming theta_qx to be the angle part of the qx, then theta_qx is the angle from vx to vx0, where:

$$\cos(theta\_qx) = v\_dot(vx, vx0)$$

$$v\_qx = v\_crs(vx, vx0)$$

Once qx is known, the object's X axis is calibrated. qx can be applied to the quaternion output of the gyroscope in later steps. This will make object's X axis aligned with that of the X axis of W-CS. This can be displayed as a visual feedback to user if needed. Then we can rotate the object about its Y axis and get its first orientation quaternion q2 and q3.

As qx is known, we need to apply qx on q2 and q3: assuming q22 and q33 to be the quaternions after applying qx:

$$q22 = q\_prd2(qx, q2)$$

$$q33 = q\_prd2(qx, q3).$$

Having q22 and q33, we can calibrate Y axis following the similar procedure as calibrating X axis.

$$qy\_dif = q\_prd2(q22\_cnj, q33)$$ where:

$$q22\_cnj = q\_cnj(q22)$$

the rotation vector vy can be obtained from qy_dif using a method in Appendix.

Another approach to get vy is qy_dif=q_prd2(q2_cnj, q2) where: q2_cnj=q_cnj(q2). The rotation vector vy0 can be obtained from qy_dif using a method in Appendix. vy can be obtained by transforming vy0 with qx.

$$vy = qvq\_trans(qx, vy0)$$

vy can be regarded as the vector aligned with Y axis of object being calibrated. Assuming vy0 to be (0, 1, 0) in CS-W1, then the quaternion qy that transformed vy to vy0 can be calculated.

As a quaternion can be interpreted as a rotation vector and an angle that rotates about this vector, assuming v_qy to be the vector part of qy, then v_qy is the cross product vector of vy to vy0. And assuming theta_qy to be the angle part of the qy, then theta_qy is the angle from vy to vy0.

$$\cos(\text{theta\_}qy)=v\_dot(vy,vy0)$$

$$v\_qy=v\_crs(vy,vy0)$$

By now both qx and qy are known. The quaternion qog that represents the orientation of the object in the gyroscope coordinate system is:

$$qog=q\_cnj(qxy) \text{ where:}$$

$$qxy=q\_prd2(qy,qx).$$

The benefit of having the calibration process in 2 steps is that user can repeat each step independently. It also makes it possible for the calibration system to provide visual feedback to user in each stage when needed.

This 2-step calibration can be also performed on different combination of axes and in different orders. The procedure described above calibrates X axis first and Y axis secondly. We can name it as M-XY.

Similarly, other combinations of rotating about any 2 of the 3 axes can achieve the same goal. In summary, all of the possible combinations are M-XY, M-XZ, M-YX, M-YZ, M-ZX, M-ZY, with first letter denoting the name of the axis to first rotate about, second letter denoting the name of the axis to secondly rotate about.

C2. Calibrating Camera Orientation Relative to Gyroscope and Camera Focal Length Coordinate systems are defined as above.

Assuming a gyroscope is attached to a camera that needs calibration. The goal is to get the orientation quaternion qcg that represent the orientation of CS-C in CS-G. Following the procedure described above. 4 raw quaternion q0, q1, q2, q3 from gyroscope can be obtained. Method described in C1 section above can be used to get qcg.

In addition, the focal length of the camera can be obtained as well. Assuming dy is the difference in pixel numbers between the top line and bottom line.

$$q\_dif=q\_prd2(q0\_cnj,q1)=(w,x,y,z)$$

where $$q0\_cnj=q\_cnj(q0).$$

Then the focal length f of the camera in pixel count is:

$$f=0.5*dy*w/\text{sqrt}(x*x+y*y+z*z).$$

C3. Obtaining Coordinates of the Center of Eye Ball in Camera Coordination System Coordinate systems are defined as above.

Assuming a gyroscope and camera are fixed on a rigid frame to form a sensing unit. The sensing unit is fixed in front of one of user's eyes. The orientation of the sensing unit is measured by the gyroscope. And the image of the center area of an eye is captured by the camera.

During eye calibration procedure, the user is required to perform an sequence of head and eye motions in order to get the right combination of gyroscope and camera sample data. The user should pick a gaze point at a distance and stare at it. A gaze point is where the user's eye is looking at. Without losing eye focus on that gaze point, the user turns the head.

It's not required where exactly the gaze point is. And it's not required what kind of motion the head has if only eye calibration is performed.

Assuming camera orientation quaternion qcg in CS-G is known through calibration in C2 section above. Assuming each sample pair contains the raw orientation quaternion qi of gyroscope output in CS-W0, and the coordinates of pupil center xyi=(xi, yi) obtained from the eye images. Assuming we have at least 3 pairs sample sets.

Sample 0: q0, (x0, y0)
Sample 1: q1, (x1, y1)
Sample 2: q2, (x2, y2)

The following steps are executed to get vec, the coordinates of the eye ball center in CS-C:

Step 1: Using input sample 0 and 1 to obtain the plane that contains the gaze vector ve0 in CS-C that is corresponding to sample 0.

$$q1\_cnj=q\_cnj(q1)$$

$$qcg\_cnj=q\_cnj(qcg)$$

$$qe01=q\_prd4(qcg\_cnj,q1\_cnj,q0,qcg)$$

$$me01=m\_frm\_q(qe01)$$

$$mi=m\_idt(\ )$$

$$mm01=m\_t(me01)$$

$$mm01=m\_sub(mm01,mi)$$

$$h0=\text{DEFOX}(x0)$$

$$v0=\text{DEFOY}(y0)$$

$$h1=\text{DEFOX}(x1)$$

$$v1=\text{DEFOY}(y1)$$

$$vv01=(vx01,vy01,vz01)$$

$$vx01=v0-v1 \ vy01=h1-h0$$

$$vz01=h0*v1-h1*v0$$

$$vp01=mv\_prd(mm01,vv01)$$

$$vp01=v\_uni(vp01)$$

where vp01 represents the plane that passes the origin of CS-E and has ve0 in it.

Step 2: Using input sample 0 and 2 to obtain the plane that contain the gaze vector in CS-C at sample 0 that is corresponding to sample 0:

$$q2\_cnj=q\_cnj(q2)$$

$$qcg\_cnj=q\_cnj(qcg)$$

$$qe02=q\_prd4(qcg\_cnj,q2\_cnj,q0,qcg)$$

$$me02=m\_frm\_q(qe02)$$

$$mi=m\_idt(\ )$$

$$mm02=m\_t(me02)$$

$$mm02=m\_sub(mm02,mi)$$

$$h0=\text{DEFOX}(x0)$$

$$v0=\text{DEFOY}(y0)$$

$$h2=\text{DEFOX}(x2)$$

$$v2=\text{DEFOY}(y2)$$

$$vv02=(vx02,vy02,vz02)$$

$$vx02=v0-v2$$

$$vy02=h2-h0$$

$$vz02=h0*v2-h2*v0$$

$$vp02=mv\_prd(mm02,vv02)$$

$$vp02=v\_uni(vp02)$$

where vp02 represents the plan that passes the origin of CS-E and has ve0 in it.

Step 3, Gaze vector ve0 in CS-C at sample 0 can be obtained by intersecting 2 planes represented by vp01, vp02 obtained from step 1 and 2, which both contain ve0 assuming:

$$vp01=(a1,b1,c1)$$

$$vp02=(a2,b2,c2)$$

then:

$$ve0=(xe0,ye0,ze0)$$

where:

$$xe0=b2*c1-b1*c2$$

$$ye0=a1*c2-a2*c1$$

$$ze0=a2*b1-a1*b2 \text{ if } (ze0<0)$$

if (ze0<0) then ve0=v_neg(ve0).

Step 4: The coordinates vec of the eye ball center in CS-C can be obtained with the output from step 1 and 2: me01, me02, h1, v1, h2, v2 and the output from step 3: ve0

$$ve1=(xe1,ye1,ze1)=m\_prd(me01,ve0)$$

$$ve2=(xe2,ye2,ze2)=m\_prd(me02,ve0)$$

vec=(xc, yc, zc) is the coordinate of the origin of CS-E in CS-C.

Defining GET_ZC(xy1, xy2, z1, z2, hv1, hv2)=(xy2−xy1−(hv2*z2−hv1*z1))/(hv2−hv1).

zc can be calculated with one of the following 6 functions,
GET_ZC(xe1, xe2, ze1, ze2, h1, h2)
GET_ZC(ye1, ye2, ze1, ze2, v1, v2)
GET_ZC(xe0, xe1, ze0, ze1, h0, h1)
GET_ZC(ye0, ye1, ze0, ze1, v0, v1)
GET_ZC(xe0, xe2, ze0, ze2, h0, h2)
GET_ZC(ye0, ye2, ze0, ze2, v0, v2)
the final choice of zc can be an evaluated and weight averaged value from some or all of the results calculated from the following 6 functions.

Defining GET_XYC(xy, zz, zzcc, hv)=(hv*(zzcc+zz)−xy)

Knowing zc, xc and yc can be calculated with one of the following 2 functions $$xc=GET\_XYC(xe1,ze1,zc,h1)$$

$$xc=GET\_XYC(xe2,ze2,zc,h2)$$

the final choice of xc can be an evaluated and weight averaged value from some or all of the results calculated from the following 6 functions.
yc can be calculated with one of the following 2 functions $$yc=GET\_XYC(ye1,ze1,zc,v1)$$

$$yc=GET\_XYC(ye2,ze2,zc,v2)$$

the final choice of yc can be an evaluated and weight averaged value from some or all of the results calculated from the following 6 functions.

G1. Calculating Gaze Vector in Camera Coordinate System

Coordinate systems are defined as above.

Assuming camera and eye have be calibrated with the method described above, and:

qcc be the the camera orientation calibration quaternion vec=(xc, yc, zc) be the coordinates of the origin of CS-E in CS-C xy=(x, y) be the center of eye pupil in camera image frame coordinate system, vgc=(xg, yg, zg) be the gaze vector that pointing from the origin of CS-E to the gaze point in CS-C.

vgc can be calculated as:

$$h=\text{DEFOX}(x)$$

$$v=\text{DEFOY}(y)$$

$$a=h*h+v*v+1$$

$$b=2*((a-1)*zc-h*xc-v*yc)$$

$$c=(xc-h*zc)*(xc-h*zc)+(yc-v*zc)*(yc-v*zc)-1$$

$$p=b*b-4*a*c$$

$$k=\text{sqrt}(p)$$

$$z1=(-b+k)/(2*a)$$

$$z2=(-b-k)/(2*a).$$

Both z1 and z2 are candidates of the solution of zv, z1 is picked as z2 is pointing away from the camera. Therefore, we have:

$$zg=z1$$

$$xg=h*(zc+zg)-xc$$

$$yg=v*(zc+zg)-yc.$$

G2. Calculating Gaze Quaternion in Head Coordinate System

Coordinate systems are defined as above.

Assuming vgh=(xvgh, yvgh, zvgh) is the gaze vector in H-CS. Assuming E-CS has it Z axis aligned with the negative direction of the gaze vector. And it can be assumed that the the X axis of E-CS is parallel to the P-ZX plane of H-CS.

Then the orientation quaternion qeh of the E-CS in H-CS can be calculated:

$$lxz=\text{sqrt}(xvgh*xvgh+zvgh*zvgh)$$

$$\sin y=xygh/lxz$$

$$\text{con } y=zygh/lxz$$

$$\sin x=-yvgh$$

$$\text{con } x=lxz$$

$$mx=m\_frm\_x\_\text{axis}(mx, \sin x, \text{con } x)$$

$$my=m\_frm\_y\_\text{axis}(my, \sin y, \text{con } y)$$

$mxy=m\_prd(my,mx)$ then:

$qeh=q\_frm\_m(mxy)$.

Appendix

A1. Coordinate Systems

A 3D coordinate system has 3 axes, X, Y and Z. Right hand rule is applied for the order of the axes and the positive rotation directions. Any 2 axes can form a plane. Therefore, there are 3 planes defined as P-XY, P-YX and P-ZX planes.

A 2D coordinate system for camera image frame has 2 axes, X, Y.

Converting from camera image frame 2D coordinate system to 3D camera coordinate system can be performed as below.

A 3D camera coordinate system has x axis pointing to the right, y axis pointing to the top and z axis pointing to the opposite direction of the lens. The captured frame by the camera has it origin in the top left corner, the coordinates (x,y) of a pixel have to be normalized first:

$h=DEFOX(x)=(x-x\_center)/FOCAL\_LEN$ $v=DEFOY(y)=(y\_center-y)/FOCAL\_LEN$ where (x_center, y_center) is the coordinates of the center of the image frame; FOCAL_LEN is the focal length of the camera in unit of pixel counts.

A point in 3D Coordinates can be represented by a 3D vector v=(x, y, z). The vector is from the origin of the coordinate system to the position of the point.

A2. Quaternion, 3D Vector and 3×3 Matrix Maths

A quaternion has 4 elements q=(w, x, y, z)

An identity quaternion: $q=q\_idt(q)=(1, 0, 0, 0)$

The conjugation of a quaternion: $q\_cnj(q)=(w, -x, -y, -z)$

The length of a quaternion: $q\_len(q)=sqrt(w*w+x*x+y*y+z*z)$

A unit quaternion has a length of 1.

The product of 2 quaternions q and p is $t=q\_prd2(q, p)=q$ where $q=(qw,qx,qy,qz)$ $P=(pw,px,py,pz)$ $t=(tw,tx,ty,tz)$ and $tw=(qw*pw-qx*px-qy*py-qz*pz)$ $tx=(qw*px+qx*pw+qy*pz-qz*py)$ $ty=(qw*py-qx*pz+qy*pw+qz*px)$ $tz=(qw*pz+qx*py-qy*px+qz*pw)$.

As a quaternion can be used to represent a rotation transformation, if q2 is product of 2 quaternion $q2=q\_prd2(q1, q0)$, then applying q2 as a orientation transformation is equivalent to applying q0 and then q1.

The product of 3 quaternions is:

$q=q\_prd3(q1,q2,q3)=q\_prd2(q1,q\_prd2(q2,q3))$

The product of 4 quaternions is:

$q=q\_prd4(q1,q2,q3,q4)=q\_prd2(q1,q\_prd3(q2,q3,q4))$

A 3D vector has 3 elements v=(x, y, z)

The length of a 3D vector: $v\_len(v)=sqrt(x*x+y*y+z*z)$

A unit 3D vector has a length of 1.

A unit quaternion can be interpreted as a combination of rotation vector and an angle rotating about this vector:

$q=(w,x,y,z)$ $v=(xv,yv,zy)$ is the rotation vector theta is the rotation angle where $w=\cos(theta/2)$ $x=xv*\sin(theta/2)$ $y=yv*\sin(theta/2)$ $z=zv*\sin(theta/2)$.

Dot product of 2 3D vectors va, vb:

$d=v\_dot(va,vb)=va \cdot vb=ax*bx+ay*by+az*bz$ where $va=(ax,ay,az)$ $vb=(bx,by,bz)$.

There is an important property of vector dot product: assuming theta to be angle between va and vb: then: $\cos(theta)=v\_dot(va, vb)$.

Cross product of 2 3D vectors va, vb: $vc=v\_crs(va, vb)=va \times vb$ where $va=(ax,ay,az)$ $vb=(bx,by,bz)$ $vc=(cx,cy,cz)$ $cx=ay*bz-az*by$ $cy=az*bx-ax*bz$ $cz=ax*by-ay*bx$.

A 3×3 matrix is:

$$m = \begin{pmatrix} Xx, Yx, Zx \\ Xy, Yy, Zy \\ Xz, Yz, Zz \end{pmatrix}$$

An identity 3×3 matrix is:

$$m = m\_idt() = \begin{pmatrix} 1, 0, 0 \\ 0, 1, 0 \\ 0, 0, 1 \end{pmatrix}$$

matrix subtraction:

$$m2 = m\_sub(m1, m0) = m1 - m0 = \begin{pmatrix} Xx1 - Xx0, Yx1 - Yx0, Zx1 - Zx0 \\ Xy1 - Xy0, Yy1 - Yy1, Zy1 - Zy0 \\ Xz1 - Xz0, Yz1 - Yz0, Zz1 - Zz0 \end{pmatrix}$$

$$m1 = \begin{pmatrix} Xx1, Yx1, Zx1 \\ Xy1, Yy1, Zy1 \\ Xz1, Yz1, Zz1 \end{pmatrix}$$

$$m0 = \begin{pmatrix} Xx0, Yx0, Zx0 \\ Xy0, Yy0, Zy0 \\ Xz0, Yz0, Zz0 \end{pmatrix}$$

matrix vector multiplication:

$$vd = \text{mv\_prd}(m, v) = m * vs$$

$$m = \begin{pmatrix} Xx, Yx, Zx \\ Xy, Yy, Zy \\ Xz, Yz, Zz \end{pmatrix}$$

$$vs = (x, y, z)$$

$$vd = (dx, dy, dz)$$

where:

$$dx = Xx*x + Yx*y + Zx*z$$

$$dy = Xy*x + Yy*y + Zy*z$$

$$dz = Xz*x + Yz*y + Zz*z$$

matrix from quaternion:

$$m = \text{m\_frm\_q}(q)$$

$$q = (qw, qx, qy, qz)$$

when m is a 3×3 matriX $$m = \begin{pmatrix} Xx, Yx, Zx \\ Xy, Yy, Zy \\ Xz, Yz, Zz \end{pmatrix}$$

and $$Xx = 1.0f - 2.0f*qy*qy - 2.0f*qz*qz$$

$$Xy = 2.0f*qx*qy + 2.0f*qw*qz$$

$$Xz = 2.0f*qx*qz - 2.0f*qw*qy$$

$$Yx = 2.0f*qx*qy - 2.0f*qw*qz$$

$$Yy = 1.0f - 2.0f*qx*qx - 2.0f*qz*qz$$

$$Yz = 2.0f*qy*qz + 2.0f*qw*qx$$

$$Zx = 2.0f*qx*qz + 2.0f*qw*qy$$

$$Zy = 2.0f*qy*qz - 2.0f*qw*qx$$

$$Zz = 1.0f - 2.0f*qx*qx - 2.0f*qy*qy.$$

Transform a 3D vectors v with a quaternion q:

$$vd = \text{qvq\_trans}(q, vs) = \text{mv\_prd}(m, vs)$$

where
q is a quaternion
vs is the source 3D vector
vd is the result 3D vector
m is a 3×3 matrix $$m = \text{m\_frm\_q}(q)$$

Matrix by rotating x axis:

$$m = \text{m\_frm\_x\_axis\_sc}(s, c)$$

where $$m = \begin{pmatrix} Xx, Yx, Zx \\ Xy, Yy, Zy \\ Xz, Yz, Zz \end{pmatrix}$$

$s = \sin(\text{theta})$ $c = \cos(\text{theta})$ and $Xx = 1.0$ $Yx = 0.0$ $Zx = 0.0$ $Xy = 0.0$ $Yy = c$ $Zy = -s$ $Xz = 0.0$ $Yz = s$ $Zz = c.$ Matrix by rotating y axis:

$$m = \text{m\_frm\_y\_axis\_sc}(s, c)$$

where $$m = \begin{pmatrix} Xx, Yx, Zx \\ Xy, Yy, Zy \\ Xz, Yz, Zz \end{pmatrix}$$

$s = \sin(\text{theta})$ $c = \cos(\text{theta})$ and $Xx = c$ $Yx = 0.0$ $Zx = s$ $Xy = 0.0$ $Yy = 1.0$ $Zy = 0.0$ $Xz = -s$ $Yz = 0.0$ $Zz = c.$ Quaternion from matrix:

$q = q\_frm\_m(m)$ where $q = (w, x, y, z)$ $$m = \begin{pmatrix} Xx, Yx, Zx \\ Xy, Yy, Zy \\ Xz, Yz, Zz \end{pmatrix}$$

and:

```
if( Zz < 0) {
  if (Xx > Yy) {
    t = 1 + Xx - Yy - Zz w = Yz - Zy
    x = t
    y = Xy + Yx z = Zx + Xz
  } else {
    t = 1 - Xx + Yy - Zz w = Zx - Xz
    x = Xy + Yx y = t
    z = Yz + Zy
  }
} else {
  if( Xx < -Yy ) {
    t = 1 - Xx - Yy + Zz w = Xy - Yx
    x = Zx + Xz y = Yz + Zy z = t
  } else {
    t = 1 + Xx + Yy + Zz w = t
    x = Yz - Zy y = Zx - Xz z = Xy - Yx
  }
}
``` sqrt( ) is square root of a floating point number.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, tracking motion and gesture of human heads and eyes as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
   measuring a movement of a person's head;
   measuring a gaze vector of at least one eye of the person;
   identifying a gesture based on a combination of a characteristic of the movement of the person's head and a characteristic of the gaze vector; and
   transmitting an instruction to a computer based on the gesture.

2. The method of claim 1, wherein the characteristic of the movement of the person's head is an axis which the movement is about.

3. The method of claim 1, wherein the characteristic of the gaze vector is a range of movement of the gaze vector during the movement of the person's head.

4. The method of claim 1, wherein measuring the movement of the person's head comprises using a spatial orientation sensor; wherein measuring the gaze vector comprises using an imaging sensor that has a fixed position and a fixed orientation relative to the spatial orientation sensor.

5. The method of claim 4, wherein the spatial orientation sensor has a fixed orientation relative to the head.

6. The method of claim 1, wherein measuring the gaze vector comprises obtaining an image of the eye using an image sensor.

7. The method of claim 6, further comprising obtaining coordinates of an eyeball center of the eye in the image.

8. The method of claim 7, further comprising calculating coordinates of the eyeball center relative to the imaging sensor.

9. A method, implemented on a machine comprising at least one processor and a memory, comprising:
   generating a first output of a spatial orientation sensor during a first rotation of an object about a first axis, wherein the first output is a change of orientation of the spatial orientation sensor during the first rotation;
   generating a second output of the spatial orientation sensor during a second rotation of the object about a second axis that is orthogonal to the first axis, wherein the second output is a change of orientation of the spatial orientation sensor during the second rotation; and
   calibrating an orientation relationship between the object and the spatial orientation sensor based on the first and second outputs.

10. The method of claim 9, wherein the object is a person's head.

11. The method of claim 9, further comprising calculating a first 3D rotation vector aligned with the first axis and a second 3D rotation vector aligned with the second axis.

12. The method of claim 9, further comprising determining an orientation of the object based on the orientation relationship.

13. A computer program product comprising a non-transitory computer readable medium having instructions recorded thereon, the instructions when executed by a computer implementing a method comprising:
   generating a first output of a spatial orientation sensor during a first rotation of an object about a first axis, wherein the first output is a change of orientation of the spatial orientation sensor during the first rotation;
   generating a second output of the spatial orientation sensor during a second rotation of the object about a second axis that is orthogonal to the first axis, wherein the second output is a change of orientation of the spatial orientation sensor during the second rotation; and
   calibrating an orientation relationship between the object and the spatial orientation sensor based on the first and second outputs.

14. The computer program product of claim 13, wherein the object is a person's head.

15. The computer program product of claim 13, wherein the information, when read by the machine, causes the machine to further perform the following: calculating a first 3D rotation vector aligned with the first axis and a second 3D rotation vector aligned with the second axis.

16. The computer program product of claim 13, wherein the information, when read by the machine, causes the machine to further perform the following: determining an orientation of the object based on the orientation relationship.

* * * * *